(12) United States Patent
Jang et al.

(10) Patent No.: US 12,300,863 B2
(45) Date of Patent: May 13, 2025

(54) FUEL CELL APPARATUS AND METHOD FOR CONTROLLING THE SAME

(71) Applicant: LG ELECTRONICS INC., Seoul (KR)

(72) Inventors: Heejoong Jang, Seoul (KR); Dongkeun Yang, Seoul (KR); Hyoungsuk Woo, Seoul (KR); Jihoon Jun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 380 days.

(21) Appl. No.: 17/982,985

(22) Filed: Nov. 8, 2022

(65) Prior Publication Data

US 2023/0178772 A1    Jun. 8, 2023

(30) Foreign Application Priority Data

Nov. 12, 2021    (KR) ........................ 10-2021-0155854

(51) Int. Cl.
*H01M 8/04746*    (2016.01)
*H01M 8/04007*    (2016.01)
*H01M 8/04014*    (2016.01)
*H01M 8/04029*    (2016.01)
*H01M 8/04082*    (2016.01)
(Continued)

(52) U.S. Cl.
CPC ... *H01M 8/04753* (2013.01); *H01M 8/04014* (2013.01); *H01M 8/04029* (2013.01); *H01M 8/04074* (2013.01); *H01M 8/04201* (2013.01); *H01M 8/04225* (2016.02); *H01M 8/04335* (2013.01); *H01M 8/04358* (2013.01); *H01M 8/0618* (2013.01); *H01M 8/2457* (2016.02)

(58) Field of Classification Search
CPC ......... H01M 8/04753; H01M 8/04014; H01M 8/04029; H01M 8/04074; H01M 8/04201; H01M 8/04225; H01M 8/04335; H01M 8/04358; H01M 8/0618; H01M 8/2457
See application file for complete search history.

(56) References Cited

U.S. PATENT DOCUMENTS 9,843,062 B2 *  12/2017  Hotto ..................... F02M 33/00
11,444,302 B2 *  9/2022  Hotto ..................... F02M 33/00

FOREIGN PATENT DOCUMENTS

JP      2007-280794     10/2007
KR   10-2009-0015273     2/2009
(Continued)

*Primary Examiner* — Stewart A Fraser
(74) *Attorney, Agent, or Firm* — KED & ASSOCIATES, LLP

(57) ABSTRACT

A fuel cell apparatus may include a stack, a reformer configured to generate reformed gas, a burner, a water supply tank configured to store cooling water, a burner air blower configured to draw in external air and then to blow the air, a vertex tube configured to convert the air into heated air and cooled air, a three-way valve configured to supply the air from the burner air blower selectively to the vertex tube or the burner, a first heat exchanger configured to exchange heat between the air discharged from the vertex tube and the cooling water, a second heat exchanger configured to exchange heat between the air discharged from the vertex tube and the reformed gas, and a four-way valve configured to supply the heated air and the cooled air to the first and second heat exchangers.

21 Claims, 10 Drawing Sheets

(51) Int. Cl.
     *H01M 8/04225*    (2016.01)
     *H01M 8/0432*     (2016.01)
     *H01M 8/0612*     (2016.01)
     *H01M 8/2457*     (2016.01)

(56) References Cited

FOREIGN PATENT DOCUMENTS

| | | |
|---|---|---|
| KR | 10-2011-0130116 | 12/2011 |
| KR | 10-2012-0071288 A | 7/2012 |
| KR | 10-2018-0068159 | 6/2018 |
| KR | 10-1951439 B1 | 5/2019 |

\* cited by examiner

FUEL CELL APPARATUS AND METHOD FOR CONTROLLING THE SAME

CROSS-REFERENCE TO RELATED APPLICATION

This application claims priority from Korean Patent Application No. 10-2021-0155854, filed in Korea on Nov. 12, 2021, with the Korean Intellectual Property Office, the subject matter of which is incorporated herein by reference in its entirety.

BACKGROUND

1. Field

The present disclosure relates to a fuel cell apparatus and a method for controlling the same, and more particularly, to a fuel cell apparatus that may control the temperatures of cooling water and reformed gas using a vertex tube.

2. Background

A fuel cell apparatus is a power generation apparatus that generates electrical energy through an electrochemical reaction between hydrogen included in a hydrocarbon-based substance, for example, methanol, ethanol, natural gas or the like, and oxygen.

The fuel cell apparatus may include, in a similar manner to a fuel cell system disclosed in Document 1 (Korean Patent Unexamined Publication No. 10-2012-0071288, the subject matter of which is incorporated herein by reference), may include a fuel processor (or fuel processing device) configured to reform fuel including hydrogen atoms into hydrogen gas, and a stack configured to generate electrical energy using hydrogen gas supplied from the fuel processor. The fuel cell apparatus may further include a heat exchanger and a cooling water pipe line configured to cool the stack and to recover heat, and a power converter configured to convert produced DC power into AC power.

Since oxygen is used in combustion of fuel gas in a burner (of the fuel processor or power generation in the stack), the fuel cell apparatus may include a blower configured to blow external air to the fuel processor or to the stack, in a similar manner to a fuel cell system disclosed in Document 2 (Korean Patent Registration No. 10-1951439), the subject matter of which is incorporated herein by reference.

The fuel cell apparatus may be first operated in a preheating mode in which a reformer configured to generate reformed gas necessary to generate electricity in the stack using fuel gas is preheated to a temperature suitable for reforming by the burner, may be operated in a reforming mode in which reforming is repeated while recirculating the reformed gas (generated by the reformer) to the burner until hydrogen, carbon monoxide, etc. in the generated reformed gas reach concentrations suitable for power generation in the stack, when the reformer reaches a temperature condition, and may be operated in a power generation mode in which the reformed gas and external air are supplied to the stack so as to produce electrical energy through the electrochemical reaction, when the reformed gas reaches a concentration condition.

The stack may exhibit maximum power generation efficiency at a temperature of about 75° C., the stack may start to be preheated due to supply of the high-temperature reformed gas and the cooling water heated through heat exchange with the reformed gas only when the fuel cell apparatus enters a power generation operation. Thus, the temperature of the stack may be low, and thus power generation efficiency may be low at an initial stage of the power generation operation of the fuel cell apparatus.

The stack may generate heat depending on the power generation operation of the fuel cell apparatus. The heat may enable the stack to reach a temperature suitable for power generation at the initial stage of the power generation operation of the fuel cell apparatus, but may need to be radiated so as to prevent the stack from overheating after the stack reaches a target temperature.

In the fuel cell apparatus, in a situation in which the power generation mode is maintained for a designated time and the stack reaches the target temperature and thus requires radiation of heat generated due to operation of the fuel cell apparatus, hot water in a water supply tank configured to store recovered heat by circulating the cooling water depending on operation of the fuel cell apparatus is discharged to the outside and then cold water from an external water supply source is supplied to the water supply tank. Thus, it may be difficult to achieve delicate heat management of the fuel cell apparatus and additional operation costs due to water supply.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
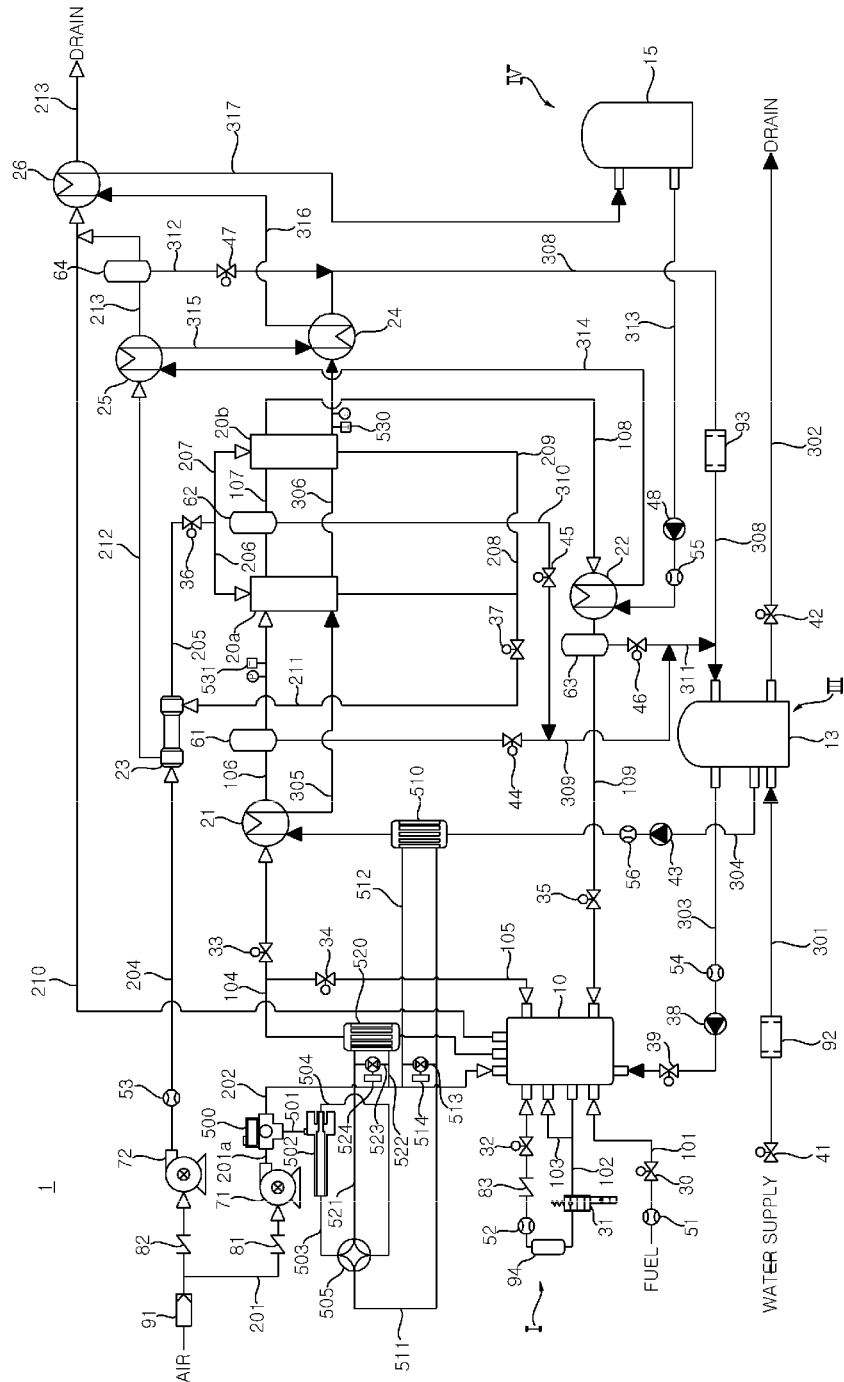
FIG. 1 is a diagram of a fuel cell apparatus according to one embodiment of the present disclosure.

A fuel cell apparatus 1 may be described with reference to FIG. 1. The following disclosure may refer to a path or a flow path. These are structural components. For example, the path or flow path may be a channel, a low channel, a flow duct, a flow line, a conduit, etc. Additionally, the following disclosure may discuss the use of water. However, other types of liquid may be used.

The fuel cell apparatus 1 may include a fuel processor I, a power generator II, a water circulator III and/or a heat recoverer IV. The fuel cell apparatus 1 may include a power converter that includes a power conversion device configured to convert DC power produced by the power generator II into AC power.

The fuel processor I may include a fuel processing device 10, a fuel valve 30 configured to control the flow of fuel gas supplied to the fuel processing device 10, and a burner air blower 71 configured to blow air to the fuel processing device 10.

The power generator II may include stacks 20a and 20b, a reformed gas heat exchanger 21 configured to exchange heat with reformed gas discharged from the fuel processing device 10, a fifth heat exchanger 22 configured to exchange heat with unreacted gas discharged from the stacks 20a and 20b, a humidifier 23 configured to supply moisture to air to be supplied to the stacks 20a and 20b, and a stack air blower 72 configured to blow air to the stacks 20a and 20b. The unreacted gas discharged from the stacks 20a and 20b may be referred to as anode off-gas (AOG). Although one embodiment of the present disclosure illustrates that the fuel cell apparatus 1 includes two stacks 20a and 20b, the present disclosure is not limited to the number of stacks.

The water circulator III may include a water supply tank 13 configured to store water produced by the fuel cell apparatus 1, a water pump 38 configured to pump water to the fuel processing device 10, a water supply valve 39 configured to control the flow of water supplied to the fuel processing device 10, and a cooling water pump 43 configured to pump water to the reformed gas heat exchanger 21. Although water is discussed in this disclosure, another liquid may also be used.

The heat recoverer IV may include a heat recovery tank 15 configured to store water used in heat exchange, and a hot water pump 48 configured to pump water stored in the heat recovery tank 15 to outside of the heat recovery tank 15.

In order to assist in understanding the present disclosure, among the respective parts and the elements of the respective parts, specific elements may be described first regardless of the sequence of operation of the respective parts or the elements of the respective parts.

Figure 2:
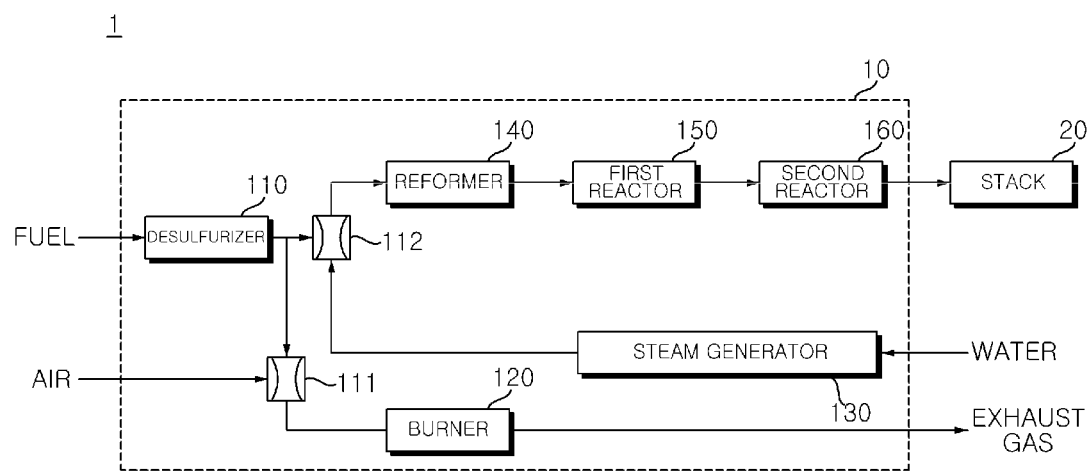
FIG. 2 is a schematic block diagram showing a configuration of the fuel cell apparatus according to one embodiment of the present disclosure.
Figure 3:
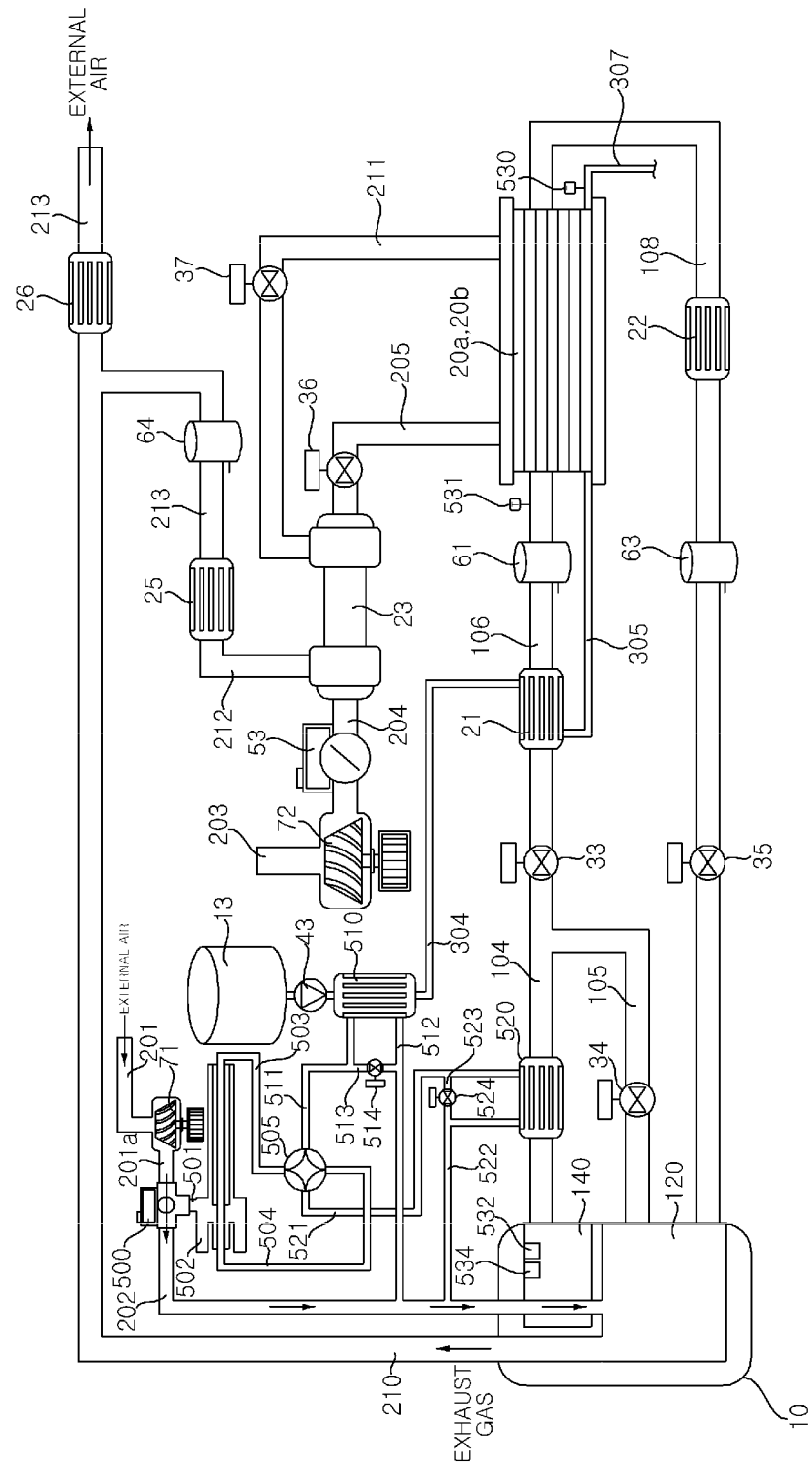
FIG. 3 is a diagram illustrating a preheating operation mode of the fuel cell apparatus according to one embodiment of the present disclosure.

Referring to FIGS. 1 to 3, the fuel cell apparatus 1 according to one embodiment may include the stacks 20a and 20b, a reformer 140 configured to generate reformed gas and then to supply the reformed gas to the stacks 20a and 20b, a burner 120 configured to heat the reformer 140, the water supply tank 13 configured to store the cooling water supplied to the stacks 20a and 20b, the burner air blower 71 configured to draw in external air and then to supply the air to the burner 120, a vortex tube 502 (or vertex tube device) configured to convert air into heated air and cooled air, and a three-way valve 500 configured to supply the air blown from the burner air blower 71 selectively to the vortex tube 502 or to the burner 120. Each of the above mentioned components may be a separate structural component.

The fuel cell apparatus 1 may include a first heat exchanger 510 configured to exchange heat between the air discharged from the vertex tube 502 and the cooling water supplied from the water supply tank 13 to the stacks 20a and 20b and then to supply the air to the burner 120, a second heat exchanger 520 configured to exchange heat between the air discharged from the vertex tube 502 and the reformed gas discharged from the reformer 140 and then to supply the air to the burner 120, and a four-way valve 505 configured to supply the heated air and the cooled air discharged from the vertex tube 502 to different ones of the first heat exchanger 510 and the second heat exchanger 520.

The stacks 20a and 20b may generate electrical energy through an electrochemical reaction between hydrogen and oxygen. For example, the stacks 20a and 20b may generate electrical energy through the electrochemical reaction between hydrogen (included in the reformed gas supplied from the fuel processing device 10) and oxygen (supplied from external air).

The stacks 20a and 20b may be formed by stacking unit cells in which the electrochemical reaction may occur. Each unit cell may include a membrane electrode assembly (MEA) including an electrolyte membrane and an anode and a cathode disposed on both surfaces of the electrolyte membrane, separators, etc. Hydrogen may be separated into protons and electrons by a catalyst so as to generate electricity at the anode of the MEA, and protons and electrons may be combined with oxygen so as to produce water at the cathode of the MEA.

The reformer 140 may generate reformed gas by reforming fuel gas, and may supply the reformed gas to the stacks 20a and 20b.

For example, the reformer 140 may perform a reforming process for generating hydrogen gas from fuel gas, from which sulfur compounds are removed, using a catalyst. The catalyst used in the reforming process may be a catalyst including nickel (Ni), alumina ($Al_2O_3$) and/or the like.

As one example, the fuel gas discharged from a desulfurizer 110 may be mixed with steam discharged from a steam generator 130 at a second mixer 112, and may be supplied to the reformer 140. When the fuel gas and the steam supplied to the reformer 140 undergo the reforming reaction, hydrogen gas may be generated. Gas discharged from the reformer 140 may be referred to as reformed gas.

The burner 120 may heat the reformer 140 so as to promote the reforming reaction in the reformer 140. As one example, the fuel gas discharged from the desulfurizer 110 and air introduced from the outside may be mixed in a first mixer 111, and may be supplied to the burner 120. The burner 120 may produce combustion heat through combustion of a mixture of the fuel gas and air supplied from the outside, and the reformer 140 may maintain a proper inner temperature (or proper internal temperature) (for example, 800° C.) due to heat supplied by the burner 120.

Exhaust gas generated by the burner 120 due to combustion of the mixture of the fuel gas and air may be discharged to the outside of the fuel processing device 10. The exhaust gas generated by the burner 120 (of the fuel processing device 10) may be discharged from the fuel processing device 10 through an exhaust gas discharge flow path 210 (or channel), may be supplied to a third heat exchanger 26, may exchange heat, and may then be discharged to the outside.

The burner air blower 71 may draw in external air and discharge the air. The burner air blower 71 may be connected to a first external air inflow path 201 (or channel), and may draw in external air introduced through the first external air inflow path 201. The burner air blower 71 may be connected to an outflow path 201a (or channel), and may discharge the drawn external air. The outflow path 201a may connect an outlet of the burner air blower 71 to an inlet of the three-way valve 500.

The three-way valve 500 may supply air discharged from the burner air blower 71 selectively to a main air supply flow path 202 (or channel) or to the vertex tube 502. As one example, the three-way valve 500 may be connected (in three directions) to the outflow path 201a, the main air supply flow path 202 and a vertex air supply flow path 501 (or channel). The three-way valve 500 may receive air discharged from the burner air blower 71 through the outflow path 201a. The three-way valve 500 may be switched to discharge the received air to the main air supply flow path 202 or to the vertex air supply flow path 501. The vertex air supply flow path 501 may connect one outlet of the three-way valve 500 to an inlet of the vertex tube 502. The main air supply flow path 202 may connect another outlet of the three-way valve 500 to the fuel processing device 10, and may supply air discharged from the burner air blower 71 to the burner 120. As one example, air supplied to the fuel processing device 10 through the main air supply flow path 202 may be mixed with fuel gas discharged from the desulfurizer 110 in the first mixer 111, and may be supplied to the burner 120.

The vertex tube 502 may convert the air discharged from the burner air blower 71 into heated air and cooled air. An inlet of the vertex tube 502 may be connected to the vertex air supply flow path 501, and the vertex tube 502 may receive air through the vertex air supply flow path 501 and convert the received air into heated air and cooled air. As one example, a heated air outlet of the vertex tube 502 may be connected to a hot air supply flow path 503 (or channel), and the heated air converted by the vertex tube 502 may be discharged through the hot air supply flow path 503. As one example, a cooled air outlet of the vertex tube 502 may be connected to a cold air supply flow path 504 (or channel), and the cooled air converted by the vertex tube 502 may be discharged through the cold air supply flow path 504.

The hot air supply flow path 503 may connect the heated air outlet of the vertex tube 502 to the four-way valve 505, and may supply the heated air discharged from the vertex tube 502 to the four-way valve 505.

The cold air supply flow path 504 may connect the cooled air outlet of the vertex tube 502 to the four-way valve 505. The cold air supply flow path 504 may supply the cooled air discharged from the vertex tube 502 to the four-way valve 505.

The four-way valve 505 may enable the heated air and the cooled air discharged from the vertex tube 502 to be discharged to different ones of a first switch flow path 511 (or channel) and a second switch flow path 521 (or channel). The four-way valve 505 may be connected (in four directions) to the hot air supply flow path 503, the cold air supply flow path 504, the first switch flow path 511 and the second switch flow path 521. As one example, the four-way valve 505 may be switched to discharge the heated air supplied through the hot air supply flow path 503 to the first switch flow path 511, and to discharge the cooled air supplied through the cold air supply flow path 504 to the second switch flow path 521 (hereinafter referred to as a "first switch mode"), or the four-way valve 505 may be switched to discharge the heated air supplied through the hot air supply flow path 503 to the second switch flow path 521, and to discharge the cooled air supplied through the cold air supply flow path 504 to the first switch flow path 511 (hereinafter referred to as a "second switch mode").

The first switch flow path 511 may connect one outlet of the four-way valve 505 to the first heat exchanger 510. The second switch flow path 521 may connect a remaining outlet of the four-way valve 505 to the second heat exchanger 520.

The first heat exchanger 510 may exchange heat between the cooling water discharged from the water supply tank 13 and air discharged from the first switch flow path 511. The first heat exchanger 510 may receive the cooling water discharged from the water supply tank 13 through a cooling water flow path 304 (or channel), may exchange heat between the cooling water and air discharged from the first switch flow path 511, and may then discharge the cooling water having exchanged heat to the cooling water flow path 304. The first heat exchanger 510 may receive the heated air (in the first switch mode) or the cooled air (in the second switch mode) discharged from the vertex tube 502 and the four-way valve 505 through the first switch flow path 511, may exchange heat between the cooling water and the heated air or the cooled air, and may then discharge the air having exchanged heat to a first air supply flow path 512.

The cooling water flow path 304 may supply the cooling water having passed through the first heat exchanger 510 to the stacks 20a and 20b. The first heat exchanger 510 may be disposed on the cooling water flow path 304 so as to divide the cooling water flow path 304 into front and rear sections. The front section of the cooling water flow path 304 may connect the water supply tank 13 to the first heat exchanger 510, and may allow the cooling water from the water supply tank 13 to be supplied to the first heat exchanger 510. The rear section of the cooling water flow path 304 may connect the first heat exchanger 510 to the reformed gas heat exchanger 21, and may allow the cooling water having passed through the first heat exchanger 510 to be supplied to the stacks 20a and 20b via the reformed gas heat exchanger 21.

The cooling water pump 43 configured to pump the water stored in the water supply tank 13 to the first heat exchanger 510 and/or a cooling water flowmeter 56 configured to detect the flow rate of water (or liquid) flowing in the cooling water flow path 304 may be disposed on the front section of the cooling water flow path 304.

The cooling water pump 43 may supply the cooling water (or cooling liquid) stored in the water supply tank 13 to the stacks 20a and 20b.

The first air supply flow path 512 may enable air having passed through the first heat exchanger 510 to be supplied to the burner 120. The first air supply flow path 512 may connect the first heat exchanger 510 to the burner 120. One end of the first air supply flow path 512 may communicate with the first heat exchanger 510, and the other end of the first air supply flow path 512 may join the main air supply flow path 202.

A first bypass flow path 513 (or channel) may branch off from the first switch flow path 511 and join the first air supply flow path 512. A first bypass valve 514 may be disposed on (or at) the first bypass flow path 513, and may be opened so that air passing through the first switch flow path 511 bypasses the first heat exchanger 510.

Air passing through the first switch flow path 511 may bypass the first heat exchanger 510 due to opening of the first bypass valve 514, and may be immediately supplied to the first air supply flow path 512 through the first bypass flow path 513.

The second heat exchanger 520 may exchange heat between the reformed gas discharged from the reformer 140 and air discharged from the second switch flow path 521. The second heat exchanger 520 may receive the reformed gas discharged from the reformer 140 through a reformed gas flow path 104 (or channel), may exchange heat between the reformed gas and air discharged from the second switch flow path 521, and may then discharge the reformed gas having exchanged heat to the reformed gas flow path 104. The second heat exchanger 520 may receive the heated air (in the second switch mode) or the cooled air (in the first switch mode) discharged from the vertex tube 502 and the four-way valve 505 through the second switch flow path 512, may exchange heat between the reformed gas and the heated air or the cooled air, and may then discharge the air having exchanged heat to a second air supply flow path 522 (or channel).

The reformed gas flow path 104 may allow the reformed gas having passed through the second heat exchanger 520 to be supplied to the stacks 20a and 20b.

The second heat exchanger 520 may be disposed on (or at) the reformed gas flow path 104 so as to divide the reformed gas flow path 104 into front and rear sections. The front section of the reformed gas flow path 104 may connect the fuel processing device 10 to the second heat exchanger 520, and may allow the reformed gas from the reformer 140 to be supplied to the second heat exchanger 520. The rear section of the reformed gas flow path 104 may connect the second heat exchanger 520 to the reformed gas heat exchanger 21, and may allow the reformed gas having passed through the second heat exchanger 520 to be supplied to the stacks 20a and 20b via the reformed gas heat exchanger 21.

A reformed gas bypass flow path 105 (or channel) may branch off from the reformed gas flow path 104 and communicate with the burner 120. The reformed gas bypass flow path 105 may branch off from the rear section of the reformed gas flow path 104, and may be connected to the burner 120. The reformed gas introduced into the burner 120 through the reformed gas bypass flow path 105 may be used as fuel for combustion in the burner 120.

A reformed gas bypass valve 34 may be disposed on (or at) the reformed gas bypass flow path 105.

The reformed gas bypass valve 34 may be opened so that the reformed gas passing through the reformed gas flow path 104 is supplied to the burner 120 through the reformed gas bypass flow path 105. Alternatively, the reformed gas bypass valve 34 may be closed so that the reformed gas passing through the reformed gas flow path 104 does not pass through the reformed gas bypass flow path 105.

A reformed gas valve 33 may be disposed downstream from a point (or portion) of the reformed gas flow path 104 in which the reformed gas bypass flow path 105 branches off. The reformed gas valve 33 may be disposed downstream from a point (or portion) of the rear section of the reformed gas flow path 104 in which the reformed gas bypass flow path 105 branches off. The reformed gas bypass valve 33 may be opened so that the reformed gas passing through the reformed gas flow path 104 is supplied to the reformed gas heat exchanger 21 and the stacks 20a and 20b. Alternatively, the reformed gas bypass valve 33 may be closed so that the reformed gas passing through the reformed gas flow path 104 is not supplied to the reformed gas heat exchanger 21 and the stacks 20a and 20b.

The second air supply flow path 522 may enable air having passed through the second heat exchanger 512 to be supplied to the burner 120. The second air supply flow path 522 may connect the second heat exchanger 520 to the burner 120. One end of the second air supply flow path 522 may communicate with the second heat exchanger 520, and the other end of the second air supply flow path 522 may join the main air supply flow path 202.

A second bypass flow path 523 (or channel) may branch off from the second switch flow path 521 and join the second air supply flow path 522. A second bypass valve 524 may be disposed on (or at) the second bypass flow path 523, and may be opened so that air passing through the second switch flow path 521 bypasses the second heat exchanger 520.

Air passing through the second switch flow path 521 may bypass the second heat exchanger 520 due to opening of the second bypass valve 524, and may be supplied to the second air supply flow path 522 through the second bypass flow path 523.

The reformed gas heat exchanger 21 may exchange heat between the cooling water passing through the cooling water flow path 304 and the reformed gas passing through the reformed gas flow path 104.

The reformed gas heat exchanger 21 may be connected to the rear section of the reformed gas flow path 104 so as to receive the reformed gas supplied through the reformed gas flow path 104. The reformed gas heat exchanger 21 may be connected to the rear section of the cooling water flow path 304 so as to receive the cooling water supplied through the cooling water flow path 304. The reformed gas heat exchanger 21 may exchange heat between the reformed gas supplied through the reformed gas flow path 104 and the cooling water supplied through the cooling water flow path 304.

A stack gas supply flow path 106 (or channel) may connect the reformed gas heat exchanger 21 to the stacks 20a and 20b, and may supply the reformed gas having exchanged heat with the cooling water in the reformed gas heat exchanger 21 to the stacks 20a and 20b.

A stack cooling water supply flow path 305 (or channel) may connect the reformed gas heat exchanger 21 to the stacks 20a and 20b, and may supply the cooling water having exchanged heat with the reformed gas in the reformed gas heat exchanger 21 to the stacks 20a and 20b.

The water supply tank 13 may store the cooling water (or cooling liquid) to be supplied to the stacks 20a and 20b. The water supply tank 13 may be connected to a water inflow path 301 (or channel), and may store the cooling water supplied from an external water supply source through the water inflow path 301. A first liquid filter 92 configured to remove foreign substances from water supplied from the outside and/or a water inflow valve 41 configured to control the flow of water flowing into the water supply tank 13 may be disposed on the water inflow path 301.

The cooling water may indicate ultrapure water acquired by removing foreign substances from water. For ease of description, the cooling water may be described as water without distinction.

The water supply tank 13 may be connected to a water discharge flow path 302 (or channel), and at least a portion of the cooling water stored in the water supply tank 13 may be discharged to the outside through the water discharge flow path 302. A water discharge valve 42 configured to control the flow of the cooling water discharged from the water supply tank 13 may be disposed on (or at) the water discharge flow path 302.

The temperature of the cooling water stored in the water supply tank 13 may be lowered by discharging the existing cooling water stored in the water supply tank 13 through the water discharge flow path 302 and receiving cold cooling water supplied from the external water supply source.

The water supply tank 13 may be connected to a water storage flow path 308 (or channel), and may store the cooling water flowing through the water storage flow path 308. The cooling water discharged from a reformed gas moisture remover 61, an additional moisture remover 62, an AOG moisture remover 63 and/or an air moisture remover 64 and flowing through a third water recovery flow path 311 (or channel) may flow into the water supply tank 13 via the water storage flow path 308. A second liquid filter 93 configured to remove foreign substances from the cooling water returned to the water supply tank 13 may be disposed on the water storage flow path 308.

At least a portion of the cooling water stored in the water supply tank 13 may flow to the reformed gas heat exchanger 21 by the cooling water pump 43, and may exchange heat with the reformed gas in the reformed gas heat exchanger 21. The cooling water discharged from the reformed gas heat exchanger 21 may be introduced into the stacks 20a and 20b through the stack cooling water supply flow path 305.

The cooling water introduced into the stacks 20a and 20b through the stack cooling water supply flow path 305 may preheat or cool the stacks 20a and 20b. The cooling water introduced into the stacks 20a and 20b may absorb heat generated due to the electrochemical reaction occurring in the stacks 20a and 20b.

The cooling water stored in the water supply tank 13 is closely related to the temperature of the stacks 20a and 20b. Thus, it may be necessary to manage the temperature of the cooling water stored in the water supply tank 13 so that the stacks 20a and 20b reach a temperature (or temperature value) suitable for power generation and maintain such a temperature.

The plurality of stacks 20a and 20b may be connected by a water connection flow path 306 (or channel). The cooling water discharged from the first stack 20a may flow into the second stack 20b through the water connection flow path 306.

The cooling water discharged from the stacks 20a and 20b may be supplied to the water supply tank 13 through a cooling water recovery flow path 307 (or channel). Alternatively, the cooling water discharged from the stacks 20a and 20b may flow into a cooling water heat exchanger 24 through the cooling water recovery flow path 307. The cooling water heat exchanger 24 may exchange heat between the cooling water discharged from the stacks 20a and 20b and the cooling water discharged from the heat recovery tank 15. The cooling water discharged from the stacks 20a and 20b may be supplied to the water supply tank 13 along the water storage flow path 308 via the cooling water heat exchanger 24, and the cooling water may be stored in the water supply tank 13.

The stack air blower 72 may draw in external air, and may then supply the air to the stacks 20a and 20b. The stack air blower 72 may be connected to a second external air inflow path 203 (or channel) connected to the first external air inflow path 201, and to a stack-side air inflow path 204 (or channel). The second external air inflow path 203 may be connected to the rear end of an air filter 91. The stack air blower 72 may blow air introduced through the second external air inflow path 203 to the stacks 20a and 20b through the stack-side air inflow path 204.

A second air-side check valve 82 configured to limit the flow direction of air may be disposed on (or at) the second external air inflow path 203.

A stack air supply flow path (or channel) may connect the stack air blower 72 to the stacks 20a and 20b. The stack air supply flow path may include the stack-side air inflow path 204, a stack-side air supply flow path 205 (or channel), and individual supply flow paths 206 and 207 (or channels). An air flowmeter 53 configured to detect the flow rate of air flowing in the stack-side air inflow path 204 may be disposed on the stack-side air inflow path 204.

The humidifier 23 may supply moisture to air introduced through the stack-side air inflow path 204, and may discharge air including moisture through the stack-side air supply flow path 205.

A stack-in valve 36 may be disposed on the stack air supply flow path so as to be opened and closed. The stack-in valve 36 configured to control the flow of air supplied to the stacks 20a and 20b may be disposed on (or at) the stack-side air supply flow path 205.

The stack-side air supply flow path 205 may be connected to the individual supply flow paths 206 and 207 respectively corresponding to the stacks 20a and 20b. Air flowing through the stack-side air supply flow path 205 may be supplied to the stacks 20a and 20b through the individual supply flow paths 206 and 207.

A stack air exhaust flow path (or channel) may connect the stacks 20a and 20b to the outside. The stack air exhaust flow path may include individual discharge flow paths 208 and 209 (or channels), a stack-side air discharge flow path 211 (or channel), a stack-side air discharge flow path 211 (or channel), an air discharge flow path 212 (or channel), and an exhaust flow path 213 (or channel).

The stack-side air discharge flow path 211 may be connected to the individual discharge flow paths 208 and 209 respectively corresponding to the stacks 20a and 20b. Air discharged from the stacks 20a and 20b may flow to the stack-side air discharge flow path 211 through the individual discharge flow paths 208 and 209. Air flowing through the stack-side air discharge flow path 211 may include moisture produced by the electrochemical reaction occurring in the stacks 20a and 20b.

The stack-side air discharge flow path 211 may be connected to the humidifier 23. The humidifier 23 may supply moisture to air flowing to the stacks 20a and 20b using moisture included in air supplied through the stack-side air discharge flow path 211. Air supplied to the humidifier 23 through the stack-side air discharge flow path 211 may be discharged to the air discharge flow path 212 via the humidifier 23.

A stack-out valve 37 may be disposed on (or at) the stack air exhaust flow path so as to be opened and closed. The stack-out valve 37 configured to control the flow of air discharged from the stacks 20a and 20b and introduced into the humidifier 23 may be disposed on (or at) the stack-side air discharge flow path 211.

The fuel cell apparatus 1 may include thermometers configured to sense temperature (or temperature value) and/or pressure gauges configured to sense pressure. The fuel cell apparatus 1 may include a thermometer configured to sense the temperature (or temperature value) of the cooling water flowing along a hot water recovery flow path 317, and a thermometer configured to sense the temperature (or temperature value) of the AOG gas discharged from the stacks 20a and 20b and flowing along an AOG discharge flow path 108.

The fuel cell apparatus 1 may include a first temperature sensor 530 configured to sense the temperature (or temperature value) of the cooling water discharged from the stacks 20a and 20b, a second temperature sensor 531 configured to sense the temperature (or temperature value) of the reformed gas supplied to the stacks 20a and 20b, and a third temperature sensor 532 configured to sense the inner temperature (or inner temperature value) of the reformer 140.

The fuel cell apparatus 1 may include a pressure gauge configured to sense the pressure of the reformed gas introduced to the stacks 20a and 20b, and a pressure gauge configured to sense the pressure of the AOG gas discharged from the stacks 20a and 20b.

The fuel cell apparatus 1 may include a concentration sensor 534 configured to sense the concentration of carbon monoxide included in the reformed gas generated by the reformer 140 and discharged therefrom.

The fuel cell apparatus 1 may include at least one controller. The controller may include at least one processor. The processor may be a general processor, such as a central processing unit (CPU). The processor may be a dedicated device, such as an ASIC, or one of other hardware-based processors. The controller is a structure to control the overall operation of the fuel cell apparatus 1. The controller may be connected to the respective elements (or components) provided in the fuel cell apparatus 1, and may transmit signals to and/or receive signals from the respective elements. The controller may confirm the temperatures (or temperature values) of the cooling water discharged from the burner 120, the reformer 140, a first reactor 150 and/or a second reactor 160, and the stacks 20a and 20b and the reformed gas supplied to the stacks 20a and 20b, based on a signal received from at least one thermometer included in the fuel cell apparatus 1.

The controller may process signals received from the respective elements (or components) provided in the fuel cell apparatus 1, and may transmit control signals depending on results of processing of the signals to the elements (or components) provided in the fuel cell apparatus 1. The controller may control the opening degrees (or opening amounts) of the respective valves provided in the fuel cell apparatus 1.

Elements/components of the fuel cell apparatus 1 according to one embodiment of the present disclosure may be described with reference to FIGS. 1 and 2.

The fuel processing device 10 may include the desulfurizer 110, the burner 120, the steam generator 130, the reformer 140, the first reactor 150 and/or the second rector 160. The fuel cell apparatus 10 may include at least one mixer, for example, the mixers 111 and 112. Each of these elements/components may be a structural element/component as a part of the fuel processing device 10.

The desulfurizer 110 may perform desulfurization in which sulfur-combined cooling water (or cooling liquid) is removed from the fuel gas. The desulfurizer 110 may include an adsorbent provided therein. The sulfur-combined cooling water included in the fuel gas passing through the desulfurizer 110 may be adsorbed onto the adsorbent. The adsorbent may include a metal oxide, zeolite, activated carbon and/or the like.

The desulfurizer 110 may include a filter configured to remove foreign substances from the fuel gas.

The steam generator 130 may vaporize the cooling water into steam, and may discharge the steam. As one example, the steam generator 130 may vaporize the cooling water by absorbing heat from exhaust gas generated by the burner 120, and from the first reactor 150 and/or the second reactor 160.

The steam generator 130 may be disposed adjacent to the first reactor 150, the second reactor 160 and/or the flow path (or channel) along which the exhaust gas discharged from the burner 120 flows.

The first mixer 111 and/or the second mixer 112 may be implemented as an ejector. For example, the second mixer 112 may be an ejector that draws in the fuel gas discharged from the desulfurizer 110 using the steam discharged from the steam generator 130.

The first reactor 150 may reduce carbon monoxide generated by the reforming reaction, among components included in gas discharged from the reformer 140. For example, carbon monoxide included in the gas discharged from the reformer 140 may react with steam in the first reactor 150, thereby being capable of producing carbon dioxide and hydrogen. The inner (or internal) temperature (for example, 200° C.) of the first reactor 150 may be lower than the inner (or internal) temperature of the reformer 140, and may be higher than room temperature.

The first reactor 150 may be referred to as a shift reactor.

The second reactor 160 may reduce remaining carbon monoxide, among components included in gas discharged from the first reactor 150. For example, preferential oxidation (PROX) in which carbon monoxide included in the gas discharged from the first reactor 150 reacts with oxygen, may occur in the second reactor 160.

Preferential oxidation (PROX) may require a large amount of oxygen and thus may require additional supply of air. Hydrogen may be diluted with the additionally supplied air, and thus the concentration of hydrogen supplied to the stacks 20a and 20b may be reduced. Therefore, in order to solve such an issue, selective methanation may be used in which carbon monoxide and hydrogen react with each other.

The reformed gas moisture remover 61 configured to control the amount of moisture included in the reformed gas may be disposed on (or at) the stack gas supply flow path 106. After moisture is removed from the reformed gas introduced into the reformed gas moisture remover 61, the reformed gas may be discharged from the reformed gas moisture remover 61.

Condensed water generated in the reformed gas moisture remover 61 may be discharged from the reformed gas moisture remover 61, and may flow to a first water recovery flow path 309 (or channel). A first water recovery valve 44 configured to control the flow of the cooling water may be disposed on (or at) the first water recovery flow path 309.

The plurality of stacks 20a and 20b may be connected to each other by a gas connection flow path 107 (or channel). Unreacted reformed gas discharged from the first stack 20a may flow into the second stack 20b through the gas connection flow path 107.

The additional moisture remover 62 configured to remove cooling water generated due to condensation of the reformed gas while passing through the first stack 20a may be disposed on (or at) the gas connection flow path 107.

The cooling water generated by the additional moisture remover 62 may be discharged from the additional moisture remover 62, and may flow towards a second water recovery flow path 310 (or channel). A second water recovery valve 45 configured to control the flow of the cooling water may be disposed on (or at) the second water recovery flow path 310. The second water recovery flow path 310 may be connected to the first water recovery flow path 309.

Unreacted gas (i.e., AOG gas) discharged from the stacks 20a and 20b may flow along the AOG discharge flow path 108.

The fifth heat exchanger 22 may be connected to the AOG discharge flow path 108 along which the AOG gas discharged from the stacks 20a and 20b flows. The fifth heat exchanger 22 may be connected to a hot water supply flow path 313 (or channel) along which the cooling water discharged from the heat recovery tank 15 flows. The fifth heat exchanger 22 may exchange heat between the AOG gas introduced thereinto through the AOG discharge flow path 108 and the cooling water supplied through the hot water supply flow path 313.

The hot water pump 48 configured to pump the cooling water stored in the heat recovery tank 15 to the fifth heat exchanger 22 and/or a hot water flowmeter 55 configured to detect the flow rate of the cooling water flowing in the hot water supply flow path 313 may be disposed on (or at) the hot water supply flow path 313.

The fifth heat exchanger 22 may be connected to an AOG supply flow path 109 (or channel), and may discharge the AOG gas having exchanged heat through the AOG supply flow path 109. The AOG gas discharged from the fifth heat exchanger 22 may flow into the fuel processing device 10 through the AOG supply flow path 109. The AOG gas supplied to the fuel processing device 10 through the AOG supply flow path 109 may be used as fuel for combustion in the burner 120.

The AOG discharge flow path 108 and the AOG supply flow path 109 along which the AOG gas discharged from the stacks 20a and 20b flows into the fuel processing device 10 may be referred to as an AOG flow path (or channel). The AOG discharge flow path 108 may be referred to as the front section of the AOG flow path, and the AOG supply flow path 109 may be referred to as the rear section of the AOG flow path.

The AOG moisture remover 63 configured to control the amount of moisture included in the AOG gas and an AOG valve 35 configured to control the flow of the AOG supplied to the fuel processing device 10 may be disposed on (or at) the AOG supply flow path 109. After moisture is removed from the AOG gas introduced into the AOG moisture remover 63, the AOG gas may be discharged from the AOG moisture remover 63.

Condensed water generated in the AOG moisture remover 63 may be discharged from the AOG moisture remover 63, and may flow through the third water recovery flow path 311. A third water recovery valve 46 configured to control the flow of the cooling water may be disposed on (or at) the third water recovery flow path 311. The third water recovery flow path 311 may be connected to the first water recovery flow path 309.

The cooling water discharged from the heat recovery tank 15 by the hot water pump 48 may be introduced into the fifth heat exchanger 22 via the hot water supply flow path 313. The cooling water having exchanged heat with the AOG gas in the fifth heat exchanger 22 may be discharged to a first hot water circulation channel 314 (or flow path).

A fourth heat exchanger 25 may be connected to the air discharge flow path 212 along which air discharged from the humidifier 23 flows. The fourth heat exchanger 25 may be connected to the first hot water circulation channel 314 in which the cooling water discharged from the fifth heat exchanger 22 flows. The fourth heat exchanger 25 may exchange heat between air introduced thereinto through the air discharge flow path 212 and the cooling water introduced into the fourth heat exchanger 25 through the first hot water circulation channel 314.

Air having exchanged heat in the fourth heat exchanger 25 may be discharged from the fourth heat exchanger 25 through the exhaust flow path 213. The exhaust flow path 213 may be connected to the exhaust gas discharge flow path 210, and the exhaust gas flowing along the exhaust gas discharge flow path 210 and air flowing along the air discharge flow path 212 may be mixed in the exhaust flow path 213.

The air moisture remover 64 may be disposed on (or at) the exhaust flow path 213. The air moisture remover 64 may control the amount of moisture included in air discharged to the outside. After moisture is removed from air introduced into the air moisture remover 64, the air may be discharged from the air moisture remover 64.

Condensed water generated in the air moisture remover 64 may be discharged from the air moisture remover 64, and may flow through a fourth water recovery flow path 312 (or channel). A fourth water recovery valve 47 configured to control the flow of the cooling water may be disposed on (or at) the fourth water recovery flow path 312. The fourth water recovery flow path 312 may be connected to the water storage flow path 308.

The cooling water having exchanged heat in the fourth heat exchanger 25 may be discharged from the fourth heat exchanger 25 through a second hot water circulation flow path 315 (or channel). The cooling water discharged from the fourth heat exchanger 35 may be introduced into the cooling water heat exchanger 24 through the second hot water circulation flow path 315.

The cooling water heat exchanger 24 may exchange heat between water introduced thereinto through the cooling water recovery flow path 307 and the cooling water introduced into the cooling water heat exchanger 24 through the second hot water circulation flow path 315.

The third heat exchanger 26 may be connected to the exhaust gas discharge flow path 210 along which exhaust gas flows. The third heat exchanger 26 may be connected to a third hot water circulation flow path 316 (or channel) along which the cooling water discharged from the cooling water heat exchanger 24 flows. The third heat exchanger 26 may exchange heat between the exhaust gas introduced through the exhaust gas discharge flow path 210 and the cooling water introduced into the third heat exchanger 26 through the third hot water circulation flow path 316.

The exhaust gas having exchanged heat in the third heat exchanger 26 may be discharged to the exhaust flow path 213, and the exhaust gas flowing along the exhaust flow path 213 may be discharged to the outside (of the fuel cell apparatus).

The cooling water having exchanged heat in the third heat exchanger 26 may be discharged to the hot water recovery flow path 317, and the cooling water flowing along the hot water recovery flow path 317 may be introduced into the heat recovery tank 15.

The control flow and operation modes of the fuel cell apparatus 1 according to one embodiment may be described with reference to FIGS. 3-10.

When the fuel cell apparatus 1 starts to be operated, the burner air blower 71 may draw in external air and discharge the drawn air, the air discharged from the burner air blower 71 may be supplied to the burner 120, and fuel may be supplied to the burner 120. Thus, a preheating operation mode may be executed in which the burner 120 is operated so as to preheat the reformer 140 (S1).

Air discharged from the burner air blower 71 may be supplied to the three-way valve 500 through the outflow path 201a. The controller may control the three-way valve 500 so as to supply the air discharged from the burner air blower 71 to the main air supply flow path 202. The air supplied to the three-way valve 500 is not supplied to the vertex tube 502 and is supplied to the burner 120 immediately through the main air supply flow path 202, since the three-way valve 500 is switched towards the main air supply flow path 202. Thus, unnecessary pressure loss may be removed.

The burner 120 may heat the reformer 140 through combustion of the received fuel and the air supplied through the main air supply flow path 202. Exhaust gas caused by the combustion may be exhausted to the outside through the exhaust gas discharge flow path 210.

In connection with the fuel supplied to the burner 120, operations of the desulfurizer 120 and the mixers 111 and 112 have been descried above, and a further detailed description thereof may be omitted.

The controller may determine whether or not a temperature value received from the third temperature sensor 532

(configured to sense the inner temperature of the reformer 140) reaches a predetermined reformer temperature value during execution of the preheating operation mode (S2). The predetermined reformer temperature value may indicate a temperature suitable for reforming reaction between the fuel and steam in the reformer 140 so as to generate reformed gas. The predetermined reformer temperature value may be a value stored in advance in the memory of the controller (or other memory).

Figure 4:
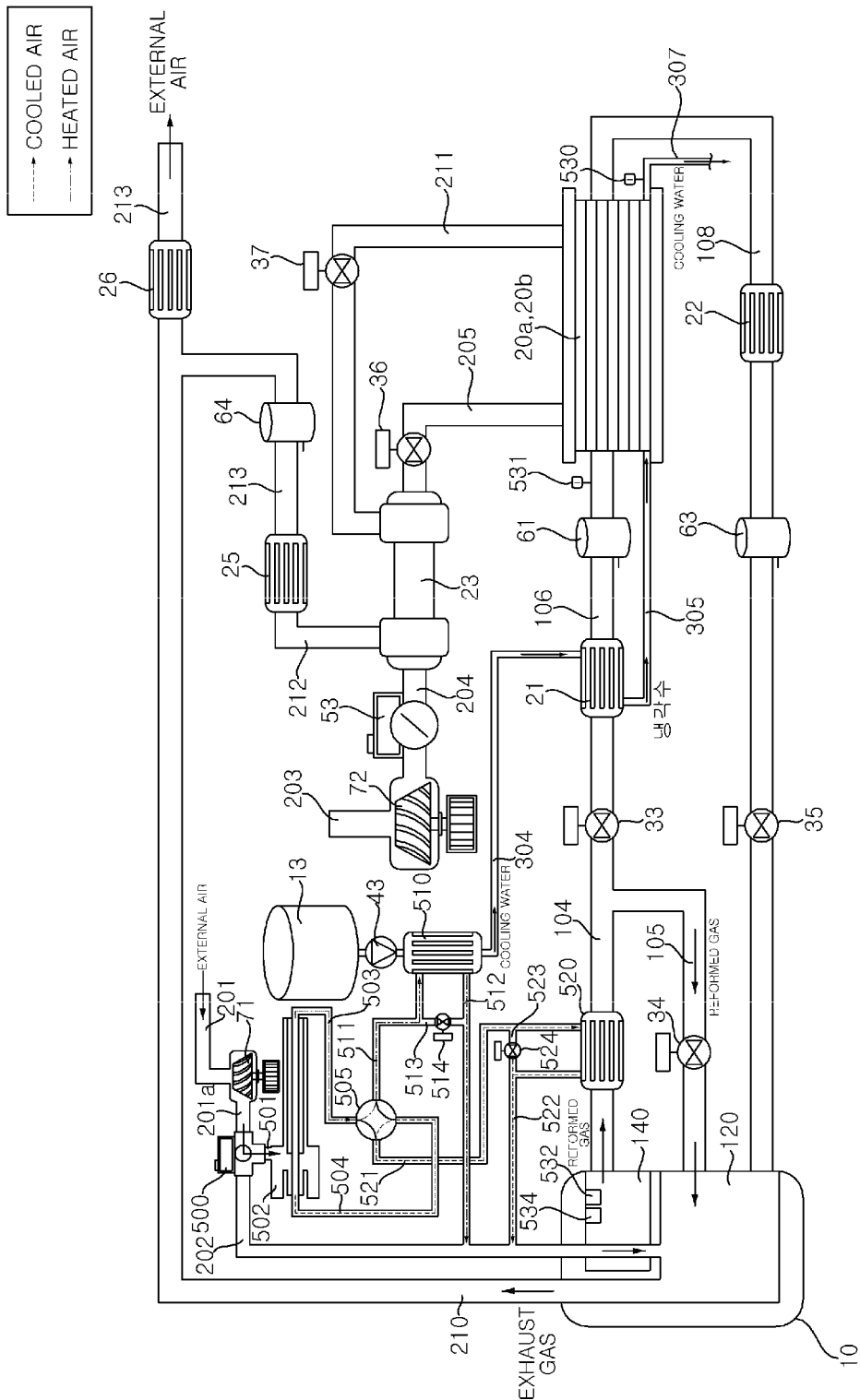
FIG. 4 is a diagram illustrating a reforming operation mode of the fuel cell apparatus according to one embodiment of the present disclosure.
Figure 5:
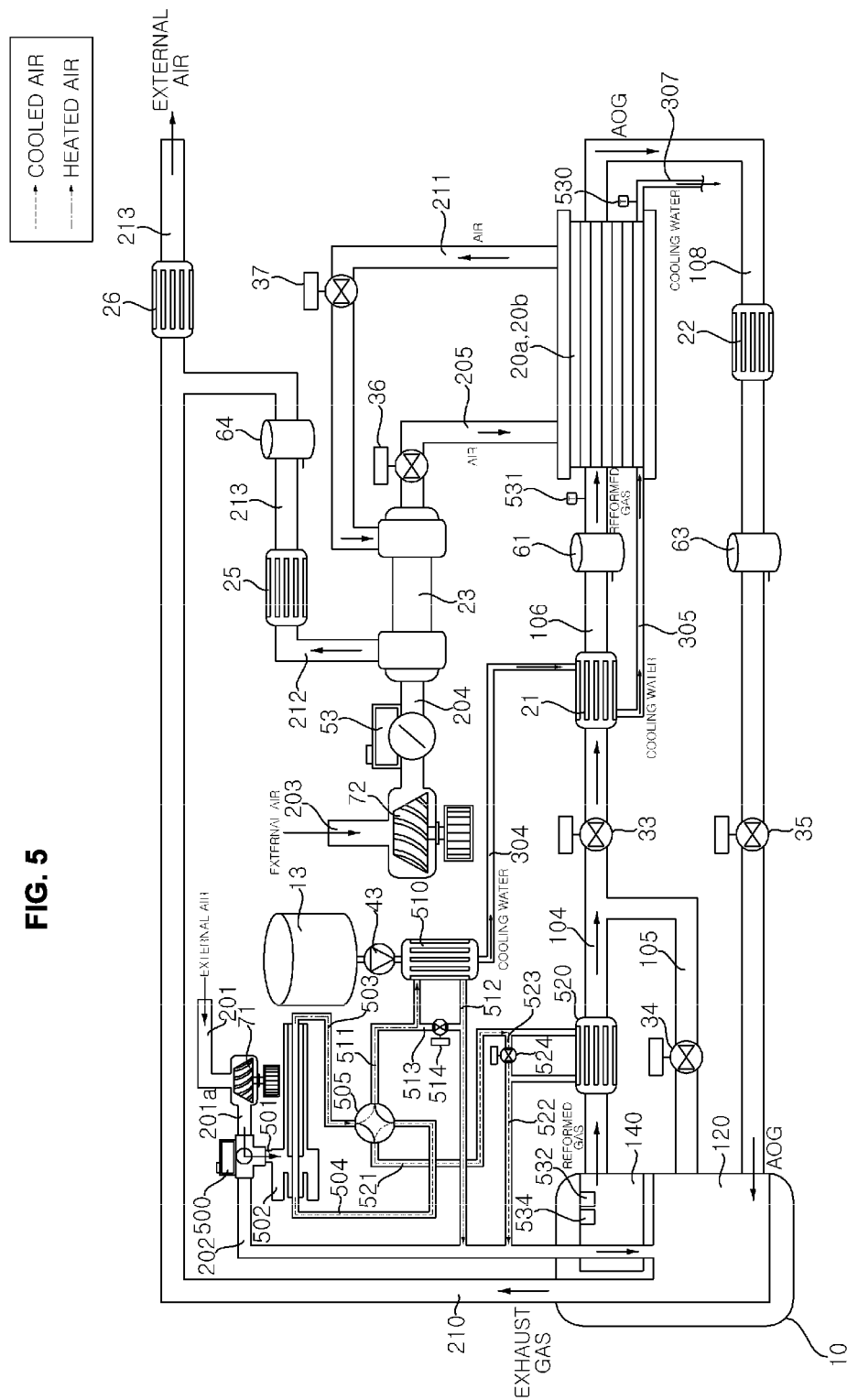
FIG. 5 is a diagram illustrating an additional cooling water preheating mode of the fuel cell apparatus according to one embodiment of the present disclosure.
Figure 6:
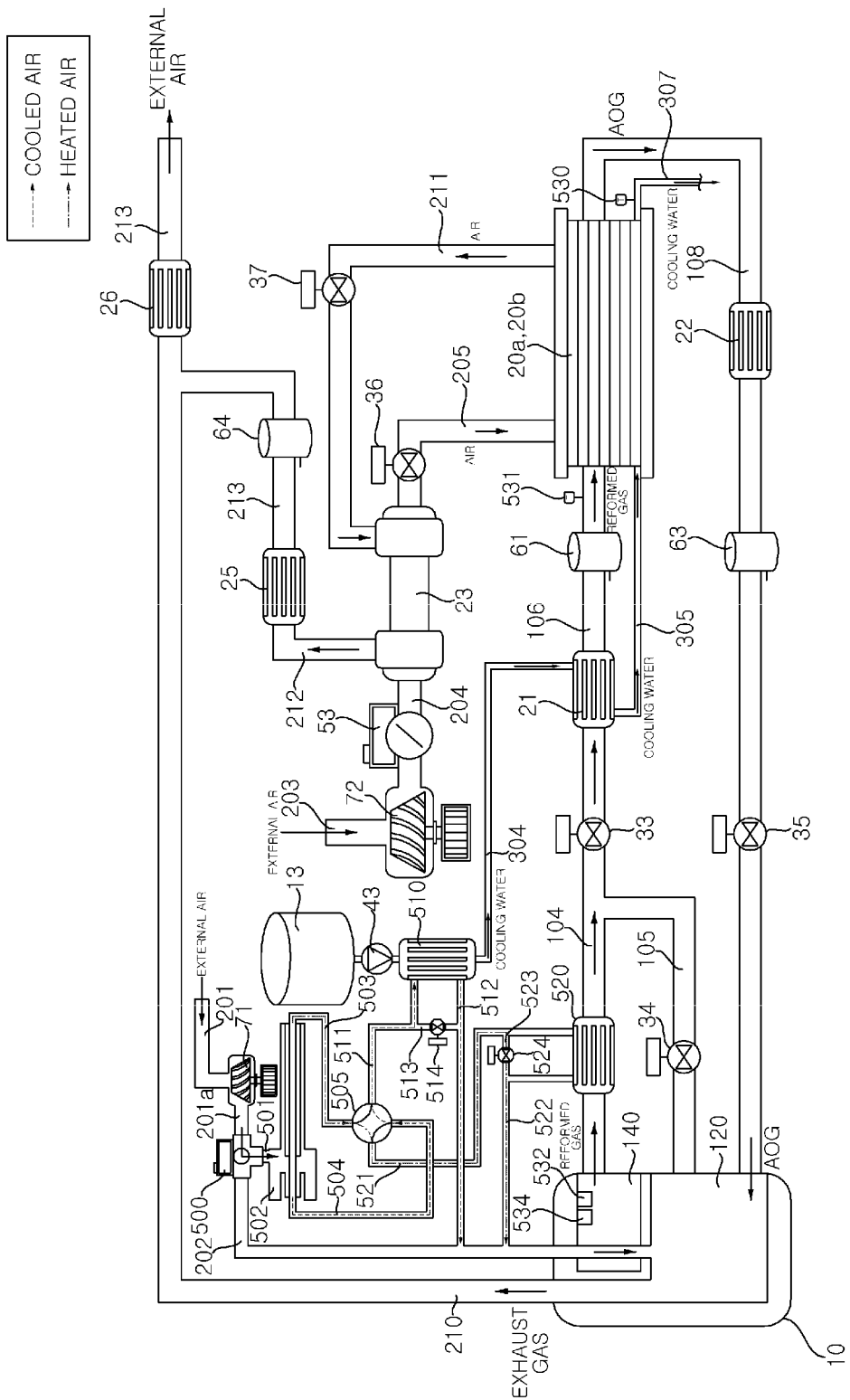
FIG. 6 is a diagram illustrating a cooling water overheating control mode of the fuel cell apparatus according to one embodiment of the present disclosure.
Figure 7:
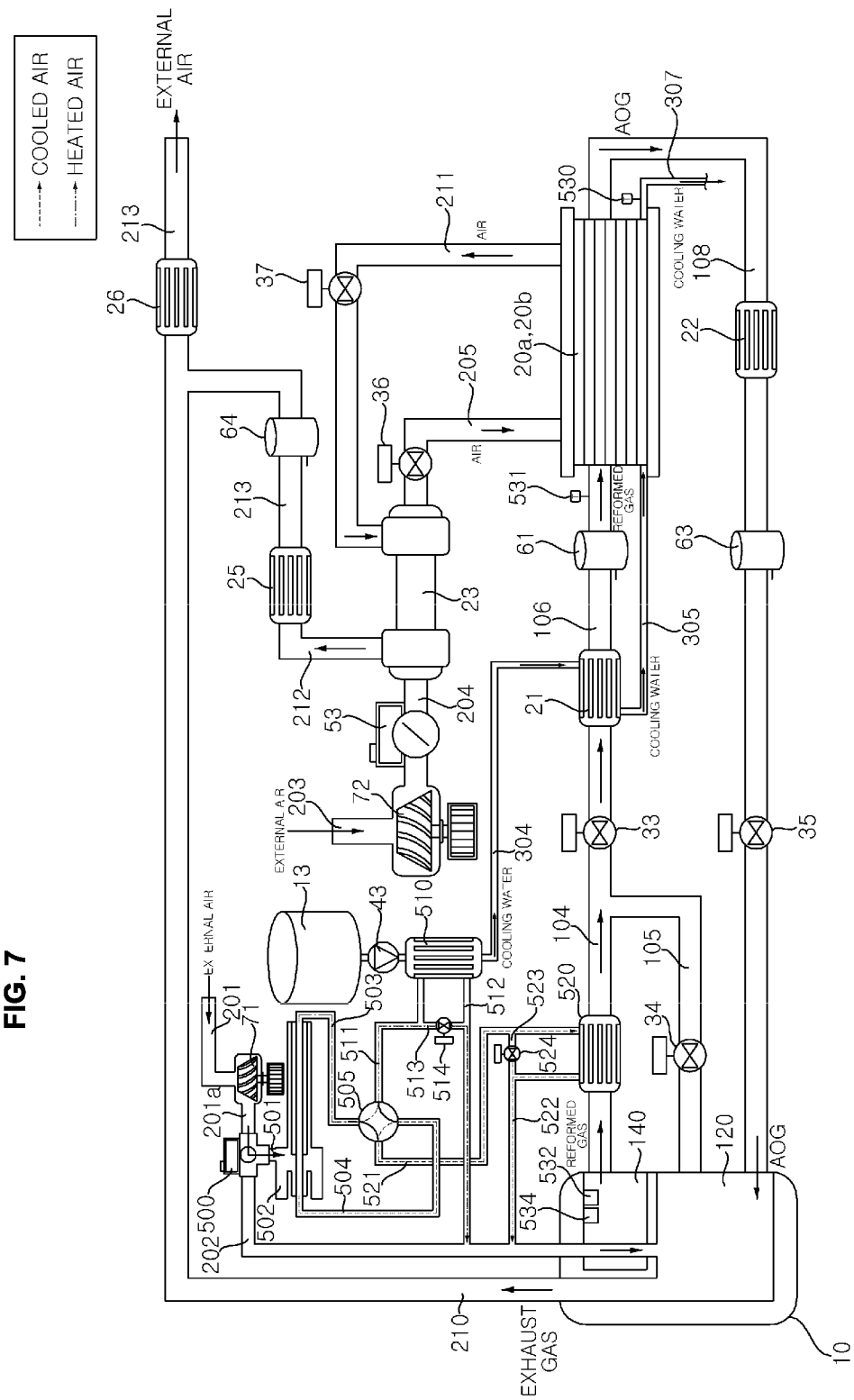
FIG. 7 is a diagram illustrating a cooling water temperature stabilization and reformed gas cooling mode of the fuel cell apparatus according to one embodiment of the present disclosure.
Figure 8:
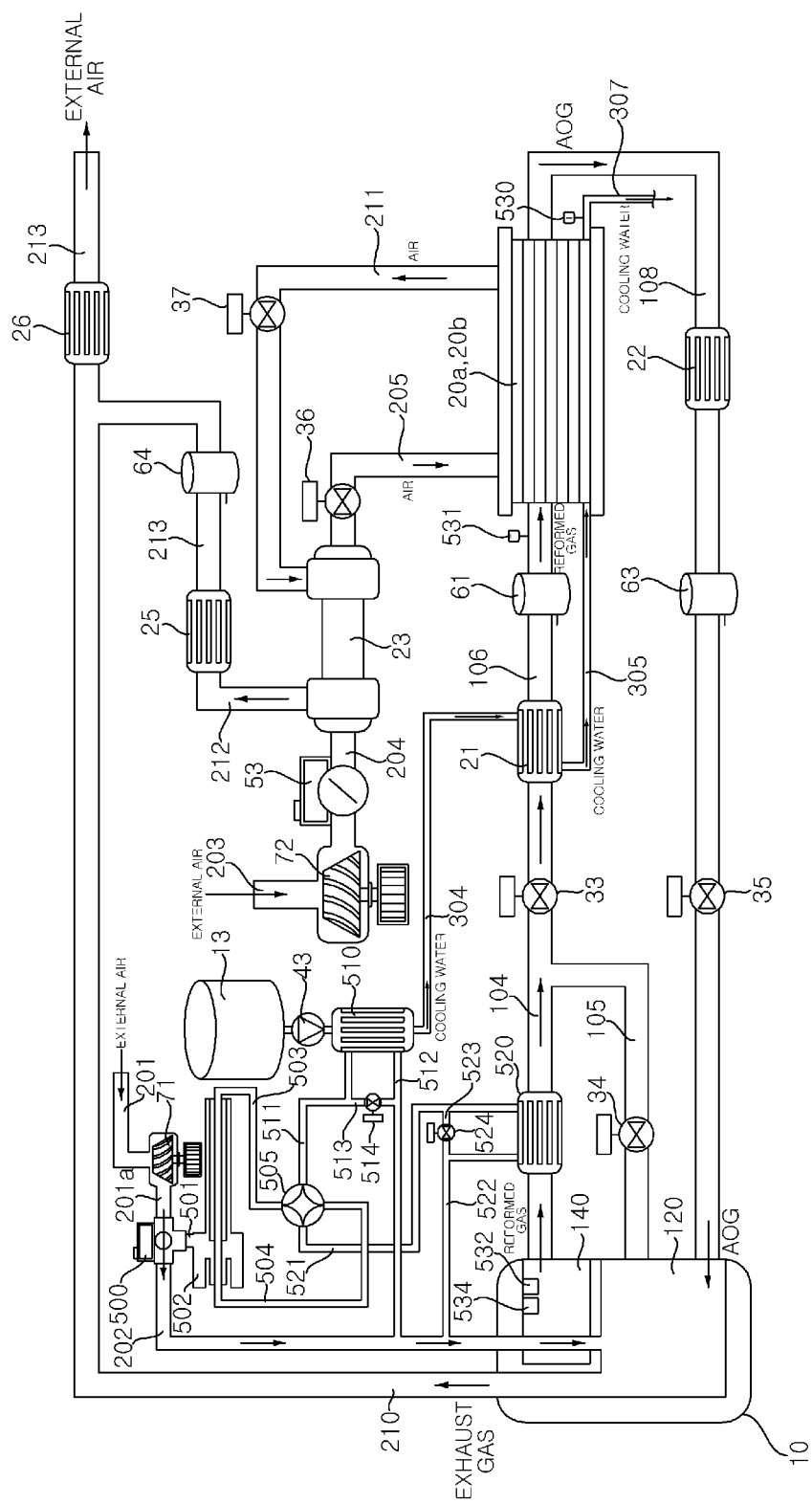
FIG. 8 is a diagram illustrating a normal operation mode of the fuel cell apparatus according to one embodiment of the present disclosure.
Figure 9:
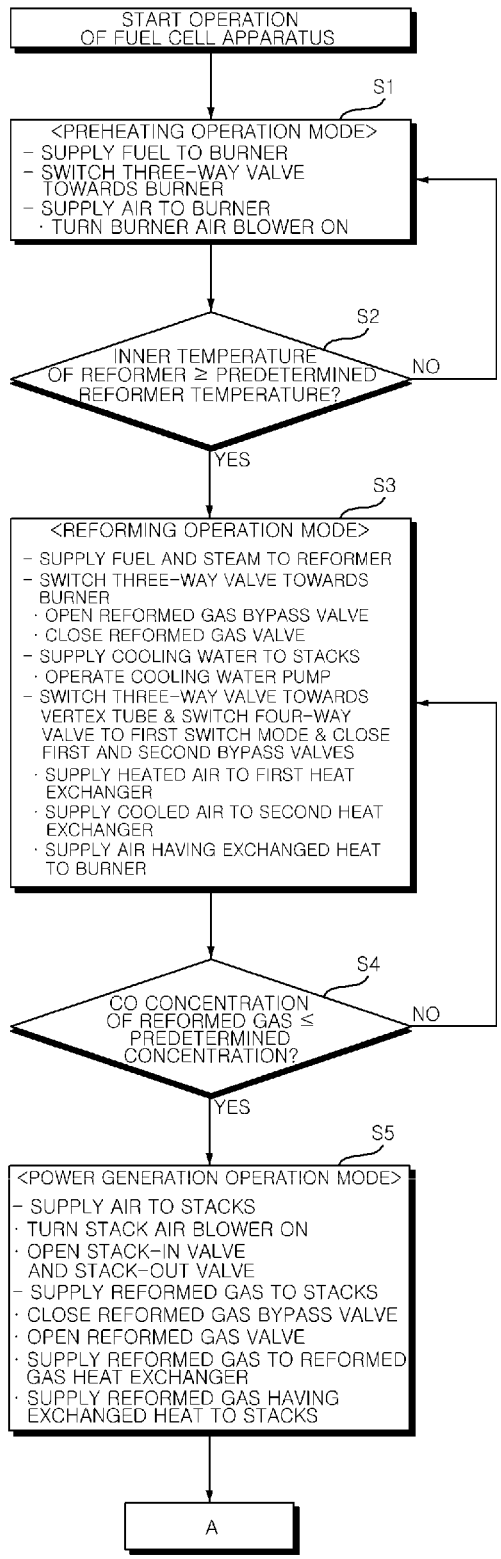
FIGS. 9 and 10 are flowcharts showing a method for controlling the fuel cell apparatus according to one embodiment of the present disclosure.
Figure 10:
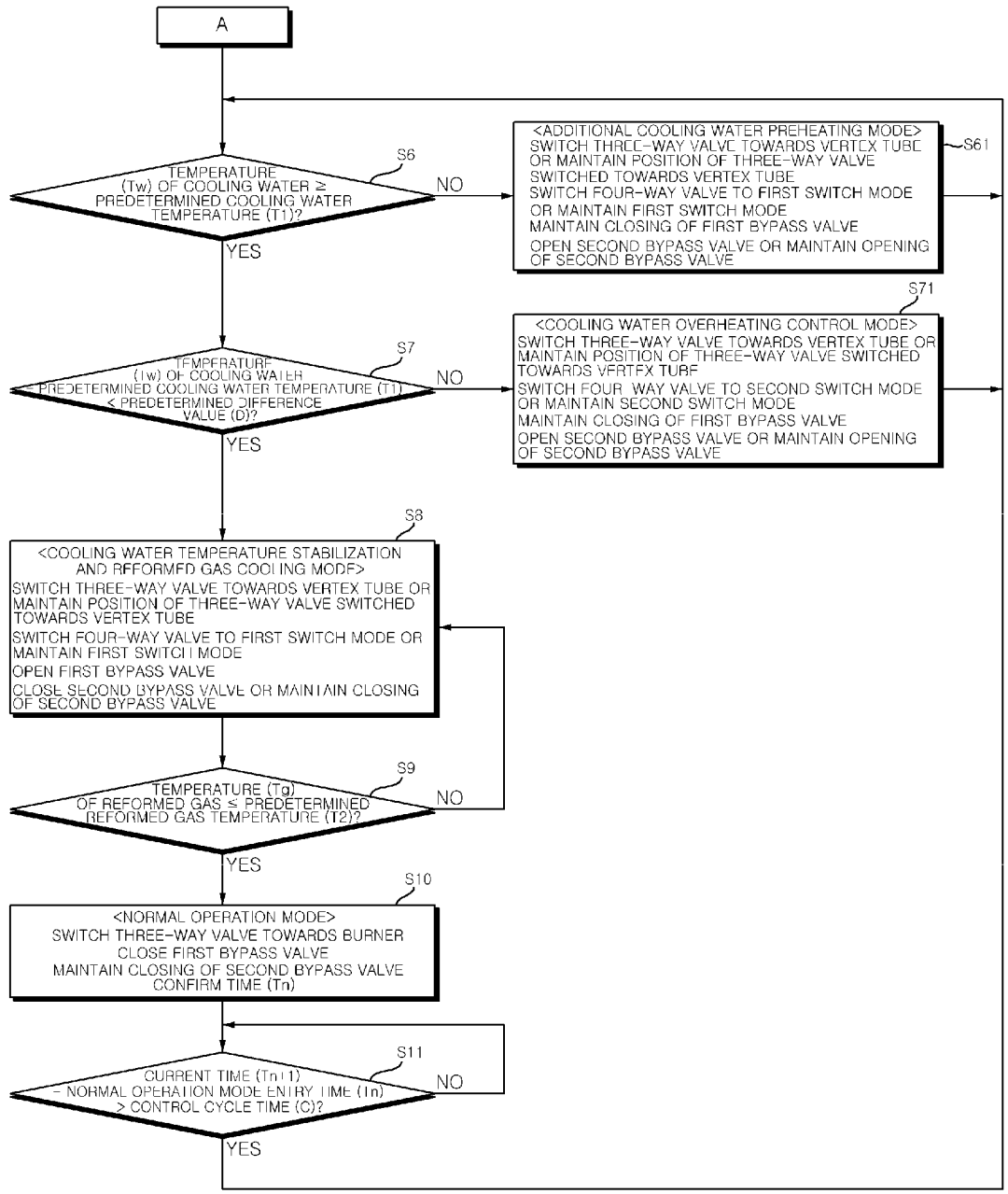

When the inner temperature (or inner temperature value) of the reformer 140 reaches the predetermined reformer temperature value, air discharged from the burner air blower 71 may be supplied to the vertex tube 502, cooling water discharged from the water supply tank 13 may exchange heat with heated air discharged from the vertex tube 502, and may then be supplied to the stacks 20a and 20b, the reformed gas generated by the reformer 140 and discharged therefrom may exchange heat with cooled air discharged from the vertex tube 502, and may then be supplied to the burner 120 (i.e., the heated air having exchanged heat and the cooled air having exchanged heat may be supplied to the burner 120), thereby being capable of executing a reforming operation mode (S3) (with reference to FIG. 4).

The fuel and the steam may be supplied to the reformer 140, and reformed gas may be generated through reforming reaction between the fuel and the steam. In connection with the fuel and the steam, operations of the desulfurizer 120, the mixers 111 and 112, and the steam generator 130 have been described above, and a further detailed description thereof may be omitted.

Air discharged from the burner air blower 71 may be supplied to the three-way valve 500 through the outflow path 201a. The controller may control the three-way valve 500 so as to supply the air discharged from the burner air blower 71 to the vertex tube 502. The air supplied to the three-way valve 500 is supplied to the vertex tube 502 through the vertex air supply flow path 501, when the three-way valve 500 is switched towards the vertex tube 502.

The vertex tube 502 may convert the received air into heated air and cooled air, and may then discharge the heated air and the cooled air. The heated air discharged from the vertex tube 502 may be supplied to the four-way valve 505 through the hot air supply flow path 503. The cooled air discharged from the vertex tube 502 may be supplied to the four-way valve 505 through the cold air supply flow path 504.

The controller may control the four-way valve 505 so as to discharge the heated air discharged from the vertex tube 502 to the first switch flow path 511 and to discharge the cooled air discharged from the vertex tube 502 to the second switch flow path 521 (in the first switch mode).

The heated air discharged to the first switch flow path 511 may be supplied to the first heat exchanger 510. The first heat exchanger 510 may exchange heat between the cooling water discharged from the water supply tank 13 and the heated air. The heated air having exchanged heat may be introduced into the main air supply flow path 202 through the first air supply flow path 512, and may be supplied to the burner 120. The heated air supplied to the burner 120 may be used in combustion.

The cooling water stored in the water supply tank 13 may be discharged from the water supply tank 13 by operation of the cooling water pump 43. The cooling water discharged from the water supply tank 13 may be preheated through heat exchange with the heated air while passing through the first heat exchanger 510, and may then be supplied to the reformed gas heat exchanger 21 through the cooling water flow path 304. The cooling water supplied to the reformed gas heat exchanger 21 may be supplied to the stacks 20a and 20b through the stack cooling water supply flow path 305. The cooling water supplied to the stacks 20a and 20b may preheat the stacks 20a and 20b, may be discharged to the cooling water recovery flow path 307, and may then be returned to the water supply tank 13.

As the cooling water discharged from the water supply tank 13 is preheated through heat exchange with the heated air in the first heat exchanger 510 and is then supplied to the stacks 20a and 20b, the preheated cooling water may transfer heat to the stacks 20a and 20b so as to rapidly preheat the stacks 20a and 20b to a temperature suitable for power generation.

The cooled air discharged to the second switch flow path 521 may be supplied to the second heat exchanger 520. The second heat exchanger 520 may exchange heat between the cooled air and the reformed gas discharged from the reformer 140. The cooled air having exchanged heat may be introduced into the main air supply flow path 202 through the second air supply flow path 522, and may be supplied to the burner 120. The cooled air supplied to the burner 120 may be used in combustion.

The controller may control the reformed gas valve 33 to be closed and control the reformed gas bypass valve 34 to be opened so as to supply the reformed gas generated by the reformer 140 and discharged therefrom to the burner 120.

The reformed gas generated by the reformer 140 and discharged therefrom may be cooled through heat exchange with the cooled air while passing through the second heat exchanger 520, and may be supplied to the burner 120 through the reformed gas flow path 104 and the reformed gas bypass flow path 105. The reformed gas supplied to the burner 120 may be used in combustion.

As the reformed gas generated by the reformer 140 and discharged therefrom is cooled through heat exchange with the cooled air in the second heat exchanger 520 and is supplied to the burner 120, the reformed gas having an improved density may be supplied to the burner 120 so as to improve combustion efficiency of the burner 120.

The controller may determine whether or not a concentration value received from the concentration sensor 534 (configured to sense the concentration of carbon monoxide included in the reformed gas generated by the reformer 140) reaches a predetermined concentration value during execution of the reforming operation mode (S4). The predetermined concentration value indicates a carbon monoxide concentration suitable for the electrochemical reaction in the stacks 20a and 20b. The predetermined concentration value may be a value stored in advance in the memory of the controller (or other memory).

When the concentration of carbon monoxide included in the reformed gas generated by the reformer 140 is equal to or less than the predetermined concentration value, the reformed gas having exchanged heat with the cooled air may exchange heat with the cooling water having exchanged heat with the heated air, and may then be supplied to the stacks 20a and 20b, and the stack air blower 72 may be operated to supply external air to the stacks 20a and 20b, thereby being capable of executing a power generation operation mode in which electrical energy is generated (S5).

The positions of the three-way valve 500, the four-way valve 505, the first bypass valve 514, and the second bypass valve 524 and whether or not these valves 500, 505, 514 and 524 are opened or closed in the power generation operation mode may be the same as the reforming operation mode.

The controller may control the reformed gas valve 33 to be opened and may control the reformed gas bypass valve 34 to be closed so as to supply the reformed gas generated by the reformer 140 and discharged therefrom to the stacks 20a and 20b.

The reformed gas generated by the reformer 140 and discharged therefrom may be cooled through heat exchange with the cooled air while passing through the second heat exchanger 520, and may then be supplied to the reformed gas heat exchanger 21 through the reformed gas flow path 104.

The cooling water stored in the water supply tank 13 may be discharged from the water supply tank 13 by operation of the cooling water pump 43. The cooling water discharged from the water supply tank 13 may be preheated through heat exchange with the heated air while passing through the first heat exchanger 510, and may then be supplied to the reformed gas heat exchanger 21 through the cooling water flow path 304.

The reformed gas heat exchanger 21 may exchange heat between the supplied cooling water and the reformed gas. The reformed gas having exchanged heat with the cooling water may be supplied to the stacks 20a and 20b through the stack gas supply flow path 106. The cooling water having exchanged heat with the reformed gas may be supplied to the stacks 20a and 20b through the stack cooling water supply flow path 305.

As the cooling water preheated while passing through the first heat exchanger 510 is additionally preheated by the reformed gas in the reformed gas heat exchanger 21 and is then supplied to the stacks 20a and 20b, the preheated cooling water may transfer heat to the stacks 20a and 20b so as to more rapidly preheat the stacks 20a and 20b to a temperature (or temperature value) suitable for power generation.

Since the reformed gas cooled while passing through the second heat exchanger 520 is additionally cooled by the cooling water in the reformed gas heat exchanger 21 and is then supplied to the stacks 20a and 20b, the reformed gas having an improved density may be supplied to the stacks 20a and 20b so as to greatly improve power generation efficiency of the stacks 20a and 20b.

The controller may operate the stack air blower 72 and open the stack-in valve 36 so as to supply external air to the stacks 20a and 20b. Air introduced into the stack air blower 72 through the second external air inflow path 203 may be supplied to the humidifier 23 through the stack-side air inflow path 204. Air charged with moisture in the humidifier 23 may be supplied to the stacks 20a and 20b through the stack-side air supply flow path 205. The air flowmeter 53 disposed on the stack-side air inflow path 204 may sense the flow rate of air supplied to the stacks 20a and 20b.

The controller may open the stack-out valve 37 so as to exhaust air from the stacks 20a and 20b to the outside (of the fuel cell apparatus). Air supplied to the stacks 20a and 20b may cause an electrochemical reaction with the reformed gas, and may then be discharged to the humidifier 23 through the stack-side air discharge flow path 211. Moisture included in the discharged air may be absorbed by the humidifier 23.

The air charged with moisture may be supplied to the fourth heat exchanger 25 through the air discharge flow path 212. The air having passed through the fourth heat exchanger 25 may be supplied to the exhaust gas discharge flow path 210 through the exhaust flow path 213. The air supplied to the exhaust gas discharge flow path 210 together with exhaust gas may be supplied to the third heat exchanger 26. The air having passed through the third heat exchanger 26 together with the exhaust gas may be exhausted to the outside through the exhaust flow path 213.

Operations of the third and fourth heat exchangers 26 and 25 and the air moisture remover 64 have been descried above, and a further detailed description may be omitted.

The stacks 20a and 20b may generate electrical energy through the electrochemical reaction between the supplied reformed gas and air. The electrochemical reaction may result in generation of heat and moisture, and such heat and moisture generated as a result of the electrochemical reaction may be discharged through the cooling water supplied to the stacks 20a and 20b, and generated steam together with air discharged from the stacks 20 and 20b may be exhausted.

The controller may determine whether or not a temperature value received from the first temperature sensor 530 (configured to sense the temperature Tw (or temperature value) of the cooling water discharged from the stacks 20a and 20b) is equal to or higher than a predetermined cooling water temperature value T1 during execution of the power generation operation mode (S6). The predetermined cooling water temperature value T1 may indicate a temperature effective in causing the electrochemical reaction between the reformed gas and air in the stacks 20a and 20b. The predetermined cooling water temperature value may be a value stored in advance in the memory of the controller (or other memory).

When the temperature Tw of the cooling water discharged from the stacks 20a and 20b is lower than the predetermined cooling water temperature value T1 during execution of the power generation operation mode, the controller may control the cooling water discharged from the vertex tube 502 to be supplied to the burner 120 without heat exchange with the reformed water generated by the reformer 140 and discharged therefrom (S61). Such an operation mode of the fuel cell apparatus 1 may be referred to as an additional cooling water preheating mode (with reference to FIG. 5).

The controller may control the three-way valve 500 to supply air discharged from the burner air blower 71 to the vertex tube 502. The controller may switch the three-way valve 500 towards the vertex tube 502, or may maintain the position of the three-way valve 500 switched towards the vertex tube 502. Air supplied to the three-way valve 500 may be supplied to the vertex tube 502 through the vertex air supply flow path 501.

The controller may control the four-way valve 505 to discharge the heated air discharged from the vertex tube 502 to the first switch flow path 511 and to discharge the cooled air to the second switch flow path 521 (in the first switch mode). The controller may switch the four-way valve 505 to the first switch mode, or maintain the position of the four-way valve 505 switched to the first switch mode.

The controller may control the first bypass valve 514 to be closed and the second bypass valve 524 to be opened. The controller may maintain the closed position of the first bypass valve 514. The controller may open the second bypass valve 524, or may maintain the open position of the second bypass valve 524.

The heated air discharged to the first switch flow path 511 does not flow to the first bypass flow path 513 due to the closed first bypass valve 514, and may be supplied to the first heat exchanger 510.

The first heat exchanger 510 may exchange heat between the cooling water discharged from the water supply tank 13 and the heated air. The heated air having exchanged heat may be introduced into the main air supply flow path 202 through the first air supply flow path 512, and may be supplied to the burner 120. The heated air supplied to the burner 120 may be used in combustion.

The cooled air discharged to the second switch flow path 521 is not supplied to the second heat exchanger 520 due to the closed first bypass valve 514, may flow to the second bypass flow path 523, and may then be supplied to the second air supply flow path 522. The cooled air supplied to the second air supply flow path 522 may be introduced into the main air supply flow path 202, and may be supplied to the burner 120. The cooled air supplied to the burner 120 may be used in combustion.

Since the heated air to be supplied to the burner 120 exchanges heat with the cooling water in the first heat exchanger 510 and is then supplied to the burner 120 and the cooled air to be supplied to the burner 120 bypasses the second heat exchanger 520 and is supplied to the burner 120 while maintaining a low temperature, the temperature of air supplied to the burner 120 is lowered and thus the density of air is improved, thereby being capable of improving combustion efficiency of the burner 120.

The cooling water stored in the water supply tank 13 may be discharged from the water supply tank 13 by operation of the cooling water pump 43. The cooling water discharged from the water supply tank 13 may be preheated through heat exchange with the heated air while passing through the first heat exchanger 510, and may then be supplied to the reformed gas heat exchanger 21 through the cooling water flow path 304.

The reformed gas generated by the reformer 140 and discharged therefrom may be supplied to the reformed gas heat exchanger 21 through the reformed gas flow path 104. As the cooled air discharged from the vertex tube 502 bypasses the second heat exchanger 502 without being supplied to the second heat exchanger 502, the reformed gas may pass through the second heat exchanger 520 while maintaining the high temperature state without losing heat to the cooled air although the reformed gas passes through the second heat exchanger 520.

The reformed gas heat exchanger 21 may exchange heat between the supplied cooling water and the reformed gas. The reformed gas supplied to the reformed gas heat exchanger 21 without losing heat to the cooled air in the second heat exchanger 520 may transfer heat to the cooling water so as to additionally preheat the cooling water, and may then be supplied to the stacks 20a and 20b through the stack gas supply flow path 106.

The cooling water having passed through the reformed gas heat exchanger 21 may be supplied to the stacks 20a and 20b through the stack cooling water supply flow path 305. The cooling water supplied to the stacks 20a and 20b may preheat the stacks 20a and 20b, may be discharged from the stacks 20a and 20b, and may then be returned to the water supply tank 13.

When the reformed gas discharged from the reformer 140 is supplied to the reformed gas heat exchanger 21 via the second heat exchanger 520, the cooling water bypasses the second heat exchanger 520 so that the reformed gas does not lose heat to the cooled air in the second heat exchanger 520, is supplied to the reformed gas heat exchanger 21 while maintaining the high temperature state, and thus exchanges heat with the cooling water. Therefore, the cooling water passing through the reformed gas heat exchanger 21 may be effectively preheated so as to more rapidly preheat the stacks 20a and 20b to the temperature suitable for power generation.

When the temperature value received from the first temperature sensor 530 configured to sense the temperature Tw of the cooling water discharged from the stacks 20a and 20b is equal to or higher than the predetermined cooling water temperature value T1 during execution of the power generation operation mode, the controller may determine whether or not a difference between the received temperature value Tw and the predetermined cooling water temperature value T1 is less than a predetermined difference value D (S7). The predetermined difference value D may be a value defining a difference from a temperature T1 (or temperature value) to a temperature T1+D (or temperature value), which is effective in causing the electrochemical reaction between the reformed gas and air in the stacks 20a and 20b. The predetermined difference value may be a value stored in advance in the memory of the controller (or other memory).

When the difference Tw−T1 between the temperature Tw of the cooling water discharged from the stacks 20a and 20b and the predetermined cooling water temperature value T1 is equal to or greater than the predetermined difference value D during execution of the power generation operation mode, the controller may control the cooled air discharged from the vertex tube 502 to exchange heat with the cooling water discharged from the water supply tank 13 and then to be supplied to the burner 120, and may control the heated air discharged from the vertex tube 502 to be supplied to the burner 120 without exchanging heat with the reformed gas generated by the reformer 140 and discharged therefrom (S71). Such an operation mode of the fuel cell apparatus 1 may be referred to as a cooling water overheating control mode (with reference to FIG. 6).

The controller may control the three-way valve 500 to supply air discharged from the burner air blower 71 to the vertex tube 502. The controller may switch the three-way valve 500 towards the vertex tube 502, or may maintain the position of the three-way valve 500 switched towards the vertex tube 502. Air supplied to the three-way valve 500 may be supplied to the vertex tube 502 through the vertex air supply flow path 501.

The controller may control the four-way valve 505 to discharge the heated air discharged from the vertex tube 502 to the second switch flow path 521 and to discharge the cooled air to the first switch flow path 511 (in the second switch mode). The controller may switch the four-way valve 505 to the second switch mode, or maintain the position of the four-way valve 505 switched to the second switch mode.

The controller may control the first bypass valve 514 to be closed, and may control the second bypass valve 524 to be opened. The controller may maintain the closed position of the first bypass valve 514. The controller may open the second bypass valve 524, or may maintain the open position of the second bypass valve 524.

The cooled air discharged to the first switch flow path 511 does not flow to the first bypass flow path 513 due to the closed first bypass valve 514, and may be supplied to the first heat exchanger 510.

The first heat exchanger 510 may exchange heat between the cooling water discharged from the water supply tank 13 and the cooled air. The cooled air having exchanged heat may be introduced into the main air supply flow path 202 through the first air supply flow path 512, and may be supplied to the burner 120. The cooled air supplied to the burner 120 may be used in combustion.

The heated air discharged to the second switch flow path 521 is not supplied to the second heat exchanger 520 due to the closed first bypass valve 514, may flow to the second bypass flow path 523, and may then be supplied to the second air supply flow path 522. The heated air supplied to the second air supply flow path 522 may be introduced into the main air supply flow path 202, and may be supplied to the burner 120. The heated air supplied to the burner 120 may be used in combustion.

The cooling water stored in the water supply tank 13 may be discharged from the water supply tank 13 by operation of the cooling water pump 43. The cooling water discharged from the water supply tank 13 may be cooled through heat exchange with the cooled air while passing through the first heat exchanger 510, and may then be supplied to the reformed gas heat exchanger 21 through the cooling water flow path 304.

The reformed gas generated by the reformer 140 and discharged therefrom may be supplied to the reformed gas heat exchanger 21 through the reformed gas flow path 104. As the heated air discharged from the vertex tube 502 bypasses the second heat exchanger 502 without being supplied to the second heat exchanger 502, the reformed gas may pass through the second heat exchanger 520 without exchanging heat with the heated air although the reformed gas passes through the second heat exchanger 520.

The reformed gas heat exchanger 21 may exchange heat between the supplied cooling water and the reformed gas. The reformed gas supplied to the reformed gas heat exchanger 21 may transfer heat to the cooling water so as to preheat the cooling water, and may then be supplied to the stacks 20a and 20b through the stack gas supply flow path 106.

The cooling water having passed through the reformed gas heat exchanger 21 may be supplied to the stacks 20a and 20b through the stack cooling water supply flow path 305. The cooling water supplied to the stacks 20a and 20b may absorb heat from the stacks 20a and 20b, may be discharged to the cooling water recovery flow path 307, and may then be returned to the water supply tank 13.

Since the cooling water is cooled through heat exchange with the cooled air in the first heat exchanger 510 and is then supplied to the stacks 20a and 20b, the cooling water may effectively absorb heat generated by the electromechanical reaction in the stacks 20a and 20b, and may maintain the proper temperature without overheating.

When the temperature Tw of the cooling water discharged from the stacks 20a and 20b is equal to or higher than the predetermined cooling water temperature value T1 and the difference between the temperature Tw of the cooling water and the predetermined cooling water temperature value T1 is less than the predetermined difference value D during execution of the power generation operation mode, the controller may control the heated air discharged from the vertex tube 502 to be supplied to the burner 120 without exchanging heat with the cooling water discharged from the water supply tank 13, and may control the cooled air discharged from the vertex tube 502 to exchange heat with the reformed gas generated by the reformer 140 and discharged therefrom and then to be supplied to the burner 120 (S8). Such an operation mode of the fuel cell apparatus 1 may be referred to as a cooling water temperature stabilization and reformed gas cooling mode (with reference to FIG. 7).

The controller may control the three-way valve 500 to supply air discharged from the burner air blower 71 to the vertex tube 502. The controller may switch the three-way valve 500 towards the vertex tube 502, or may maintain the position of the three-way valve 500 switched towards the vertex tube 502. Air supplied to the three-way valve 500 may be supplied to the vertex tube 502 through the vertex air supply flow path 501.

The controller may control the four-way valve 505 to discharge the heated air discharged from the vertex tube 502 to the first switch flow path 511 and to discharge the cooled air to the second switch flow path 521 (in the first switch mode). The controller may switch the four-way valve 505 to the first switch mode, or maintain the position of the four-way valve 505 switched to the first switch mode.

The controller may control the first bypass valve 514 to be opened, and may control the second bypass valve 524 to be closed. The controller may open the closed first bypass valve 514. The controller may close the second bypass valve 524, or may maintain the closed position of the second bypass valve 524.

The heated air discharged to the first switch flow path 511 does not flow to the first heat exchanger 510 due to the open first bypass valve 514, and may be supplied to the first air supply flow path 512 through the first bypass flow path 513. The heated air supplied to the first air supply flow path 512 may be introduced into the main air supply flow path 202, and may be supplied to the burner 120. The heated air supplied to the burner 120 may be used in combustion.

The cooled air discharged to the second switch flow path 521 does not flow to the second bypass flow path 523 due to the closed second bypass valve 524, and may be supplied to the second heat exchanger 520.

The second heat exchanger 520 may exchange heat between the reformed gas discharged from the reformer 140 and the cooled air. The cooled air having exchanged heat may be introduced into the main air supply flow path 202 through the second air supply flow path 522, and may be supplied to the burner 120. The cooled air supplied to the burner 120 may be used in combustion.

The cooling water stored in the water supply tank 13 may be discharged from the water supply tank 13 by operation of the cooling water pump 43. As the heated air discharged from the vertex tube 502 bypasses the first heat exchanger 501 without being supplied to the first heat exchanger 501, the cooling water may pass through the first heat exchanger 510 without exchanging heat with the heated air although the cooling water passes through the first heat exchanger 510. The cooling water having passed through the first heat exchanger 510 may be supplied to the reformed gas heat exchanger 21 through the cooling water flow path 304.

The reformed gas generated by the reformer 140 and discharged therefrom may be cooled through heat exchange with the cooled air while passing through the second heat exchanger 520, and may then be supplied to the reformed gas heat exchanger 21 through the reformed gas flow path 104.

The reformed gas heat exchanger 21 may exchange heat between the supplied cooling water and the reformed gas. The reformed gas supplied to the reformed gas heat exchanger 21 may transfer heat to the cooling water so as to preheat the cooling water, and may then be supplied to the stacks 20a and 20b through the stack gas supply flow path 106.

The cooling water having passed through the reformed gas heat exchanger 21 may be supplied to the stacks 20a and 20b through the stack cooling water supply flow path 305. The cooling water supplied to the stacks 20a and 20b may absorb heat from the stacks 20a and 20b, may be discharged to the cooling water recovery flow path 307, and may then be returned to the water supply tank 13.

Since the reformed gas is primarily cooled through heat exchange with the cooled air in the second heat exchanger 520, is additionally cooled through heat exchange with the cooling water in the reformed gas heat exchanger 21, and is then supplied to the stacks 20a and 20b, the reformed gas having an improved density may be supplied to the stacks 20a and 20b so as to greatly improve power generation efficiency of the stacks 20a and 20b.

By opening the first bypass valve 514 so as not to supply the heated air to the first heat exchanger 510, the cooling water passing through the first heat exchanger 510 does not exchange heat with the heated air, and thus the temperature of the cooling water may be maintained.

The controller may determine whether or not a temperature value received from the second temperature sensor 531 (configured to sense the temperature Tg (or temperature value) of the reformed gas supplied to the stacks 20a and 20b) is equal to or lower than a predetermined reformed gas temperature value T2 during execution of the cooling water temperature stabilization and reformed gas cooling mode (S9). The predetermined reformed gas temperature value T2 may indicate the maximum temperature out of the temperature values of the reformed gas configured to form a reformed gas density effective in causing the electrochemical reaction in the stacks 20a and 20b. The predetermined reformed gas temperature value may be a value stored in advance in the memory of the controller (or other memory).

When the temperature Tg of the reformed gas supplied to the stacks 20a and 20b is equal to or less than the predetermined reformed gas temperature value T2, the controller may control air discharged from the burner air blower 71 to be supplied to the burner 120 (S10). Such an operation mode of the fuel cell apparatus 1 may be referred to as a normal operation mode (with reference to FIG. 8).

The controller may control the three-way valve 500 to supply air discharged from the burner air blower 71 to the burner 120. The controller may switch the three-way valve 500 towards the burner 120. Air supplied to the three-way valve 500 may be supplied to the burner 120 through the main air supply flow path 202.

The controller may control both the first bypass valve 514 and the second bypass valve 524 to be closed. The controller may close the open first bypass valve 514. The controller may maintain the closed position of the second bypass valve 524.

The cooling water stored in the water supply tank 13 may be discharged from the water supply tank 13 by operation of the cooling water pump 43. As air discharged from the burner air blower 71 is not supplied to the vertex tube 502 and is supplied to the burner 120, the cooling water may pass through the first heat exchanger 510 without separate heat exchange. The cooling water having passed through the first heat exchanger 510 may be supplied to the reformed gas heat exchanger 21 through the cooling water flow path 304.

As air discharged from the burner air blower 71 is not supplied to the vertex tube 502 and is supplied to the burner 120, the reformed gas generated by the reformer 140 and discharged therefrom may pass through the second heat exchanger 520 without separate heat exchange. The reformed gas having passed through the second heat exchanger 520 may be supplied to the reformed gas heat exchanger 21 through the reformed gas flow path 104.

The reformed gas heat exchanger 21 may exchange heat between the supplied cooling water and the reformed gas. The reformed gas supplied to the reformed gas heat exchanger 21 may transfer heat to the cooling water so as to preheat the cooling water, and may then be supplied to the stacks 20a and 20b through the stack gas supply flow path 106.

The cooling water having passed through the reformed gas heat exchanger 21 may be supplied to the stacks 20a and 20b through the stack cooling water supply flow path 305. The cooling water supplied to the stacks 20a and 20b may absorb heat from the stacks 20a and 20b, may be discharged to the cooling water recovery flow path 307, and may then be returned to the water supply tank 13.

Unnecessary heat exchange between the reformed gas and the cooling water reaching temperatures suitable for causing the electrochemical reaction in the stacks 20a and 20b may be prevented. Thus, the temperatures (or temperature values) of the cooling water and the reformed gas may be maintained so as to greatly improve power generation efficiency of the stacks 20a and 20b.

The controller may confirm a time Tn at which the fuel cell apparatus 1 enters the normal operation mode, and store the confirmed time in the memory.

The controller may confirm a present time Tn+1 during execution of the normal operation mode, and may calculate an elapsed time (Tn+1)−Tn after entering the normal operation mode. The controller may determine whether or not the elapsed time (Tn+1)−Tn after entering the normal operation mode is longer than a control cycle time C (S11).

When the elapsed time (Tn+1)−Tn after entering the normal operation mode is longer than the control cycle time C, the fuel cell apparatus 1 may return to operation S6 so as to start control of the temperatures of the cooling water and the reformed gas.

The control cycle time C may be a cycle time configured to control the temperatures (or temperature values) of the cooling water and the reformed gas. The control cycle time may be a value stored in advance in the memory of the controller (or other memory).

Although the drawings show operations performed in a particular order, the operations described herein are not to be construed as necessarily requiring their performance in the particular order discussed or illustrated, unless specifically identified as an order of performance. It is also to be understood that multi-tasking and parallel processing may be employed, in particular cases.

For example, although this embodiment describes operations S1 to S11 in order of time, this is only one embodiment for assisting in understanding of the present disclosure, and the present disclosure is not limited to this order in performance of operations S1 to S11.

As is apparent from the above description, in a fuel cell apparatus according to one embodiment of the present disclosure, during execution of a preheating operation mode in which the burner is operated to preheat a reformer, a three-way valve is controlled to supply air blown from a burner air blower to a burner rather than to a vertex tube. This may remove unnecessary pressure loss from air supplied to the burner.

In the fuel cell apparatus according to one embodiment, during execution of a reforming operation mode in which reforming is repeated to sufficiently reduce the concentration of carbon monoxide contained in reformed gas generated by the reformer, the three-way valve is controlled to supply air blown from the burner air blower to a vertex tube, a four-way valve is controlled to supply heated air discharged from the vertex tube to a first heat exchanger and cooled air discharged from the vertex tube to a second heat exchanger, and first and second bypass valves are closed, so as to preheat cooling water through heat exchange with the heated air in the first heat exchanger and then to supply the cooling water to stacks. This may allow the preheated cooling water to transfer heat to the stacks and thus being capable of rapidly preheating the stacks to a temperature (or temperature value) suitable for power generation.

In the fuel cell apparatus according to one embodiment, the reformed gas generated by the reformer and discharged therefrom exchanges heat with the cooled air in the second heat exchanger and is then supplied to the burner, so as to supply the reforming gas having an improved density to the burner. This may improve combustion efficiency of the burner.

In the fuel cell apparatus according to one embodiment, during execution of a power generation operation mode in which the reformed gas and external air are supplied to the stacks to generate electrical energy, the cooling water preheated by the heated air while passing through the first heat exchanger is additionally preheated by the reformed gas in a reformed gas heat exchanger and is then supplied to the stacks, so as to enable the preheated cooling water to transfer heat to the stacks. This may more rapidly preheat the stacks to the temperature (or temperature value) suitable for power generation.

In the fuel cell apparatus according to one embodiment, the reformed gas cooled by the cooled air while passing through the second heat exchanger is additionally cooled by the cooling water in the reformed gas heat exchanger and is then supplied to the burner, so as to supply the reforming gas having an improved density to the stacks. This may improve power generation efficiency of the stacks.

In the fuel cell apparatus according to one embodiment, during execution of the power generation operation mode, the first bypass valve is controlled to be closed and the second bypass valve is controlled to be opened, and thus the heated air supplied to the burner is cooled through heat exchange with the cooling water in the first heat exchanger and is then supplied to the burner, and the cooled air supplied to the burner bypasses the second heat exchanger and is supplied to the burner while maintaining a low temperature. This may improve combustion efficiency of the burner through supply of air having an improved density to the burner.

In the fuel cell apparatus according to one embodiment, when the reformed gas discharged from the reformer is supplied to the reformed gas heat exchanger through the second heat exchanger, the cooled air bypasses the second heat exchanger, the reformed gas does not lose heat to the cooled air in the second heat exchanger and is supplied to the reformed gas heat exchanger while maintaining a high temperature so as to exchange heat with the cooled air, and thus the cooling water passing through the reformed gas heat exchanger is effectively preheated. This may more rapidly preheat the stacks to the temperature (or temperature value) suitable for power generation.

In the fuel cell apparatus according to one embodiment, during execution of the power generation operation mode, the four-way valve is controlled to supply the heated air discharged from the vertex tube to the second heat exchanger and to supply the cooled air to be supplied to the first heat exchanger, and thus allow the cooling water to be cooled through heat exchange in the first heat exchanger and then to be supplied to the stacks. This may enable the cooling water to effectively absorb heat generated due to an electrochemical reaction in the stacks and to maintain a proper temperature (or temperature value) without overheating.

In the fuel cell apparatus according to one embodiment, the reformed gas is primarily cooled through heat exchange with the cooled air in the second heat exchanger, is additionally cooled through heat exchange with the cooling water in the reformed gas heat exchanger, and is then supplied to the stacks, so as to supply the reformed gas having an improved density to the stacks. This may greatly improve power generation efficiency of the stacks.

In the fuel cell apparatus according to one embodiment, during execution of the power generation mode, the four-way valve is controlled to supply the heated air discharged from the vertex tube to the first heat exchanger and to supply the cooled air to be supplied to the second heat exchanger, the first bypass valve is controlled to be opened, and the second bypass valve is controlled to be closed, so as to prevent the heated air from being supplied to the first heat exchanger and thus to prevent the cooling water passing through the first heat exchanger from exchanging heat with the heated air. This may maintain the temperature (or temperature value) of the cooling water.

In the fuel cell apparatus according to one embodiment, during execution of the power generation mode, when the cooling water and the reformed gas reach temperatures (or temperature values) suitable for power generation, the three-way valve is switched towards the burner so as to prevent unnecessary heat exchange between the cooling water and the reformed gas in the first and second heat exchanger, thereby being capable of maintaining the temperatures (or temperature values) of the cooling water and the reformed gas. This may maintain high power generation efficiency of the stacks.

It is an object of the present disclosure to provide a fuel cell apparatus capable of shortening a time taken to preheat a stack to a temperature (or temperature value) suitable for power generation so as to improve power generation efficiency.

It is an object of the present disclosure to provide a fuel cell apparatus capable of simply and effectively radiating waste heat generated by a stack so as to maintain the optimum temperature.

It is an object of the present disclosure to provide a fuel cell apparatus capable of improving the density of reformed gas supplied to a burner or a stack so as to improve combustion efficiency of the burner or power generation efficiency of the stack.

It is an object of the present disclosure to provide a fuel cell apparatus capable of improving the density of air supplied to a burner so as to improve combustion efficiency of the burner.

It is an object of the present disclosure to provide a fuel cell apparatus capable of delicately managing the temperature (or temperature value) of cooling water supplied to a stack so as to reach the optimum temperature.

It is an object of the present disclosure to provide a fuel cell apparatus capable of delicately managing the temperature (or temperature value) of reformed gas supplied to a burner or a stack so as to reach the optimum temperature.

In order to accomplish the above and other objects, a fuel cell apparatus according to one aspect of the present disclosure may include a stack, a reformer configured to generate reformed gas and to supply the reformed gas to the stack, a burner configured to heat the reformer, a water supply tank configured to store cooling water supplied to the stack, a burner air blower configured to draw in external air and then to blow the air, a vertex tube configured to convert the air into heated air and cooled air, and a three-way valve configured to supply the air blown from the burner air blower selectively to the vertex tube or the burner.

The fuel cell apparatus may include a first heat exchanger configured to exchange heat between the air discharged from the vertex tube and the cooling water supplied from the water supply tank to the stack and then to supply the air to the burner, a second heat exchanger configured to exchange heat between the air discharged from the vertex tube and the reformed gas discharged from the reformer and then to supply the air to the burner, and a four-way valve configured to supply the heated air and the cooled air discharged from the vertex tube to different ones out of the first heat exchanger and the second exchanger.

The fuel cell apparatus may include a reformed gas bypass flow path configured to allow the reformed gas discharged from the reformer and having passed through the second heat exchanger to be supplied to the burner, and a reformed gas bypass valve disposed on the reformed gas bypass flow path so as to be opened and closed.

As the cooling water discharged from the water supply tank is preheated through heat exchange with the heated air in the first heat exchanger and is then supplied to the stack, the preheated cooling water may transfer heat to the stack, and may thus rapidly preheat the stack to a temperature suitable for power generation.

As the reformed gas generated by the reformer and discharged therefrom is cooled through heat exchange with the cooled air in the second heat exchanger and is then supplied to the burner or the stack, the reformed gas having an improved density may be supplied to the burner or the stack, and may thus improve combustion efficiency of the burner or power generation efficiency of the stack.

The three-way valve may be switched so as to prevent unnecessary heat exchange between the cooling water and the reformed gas reaching temperatures suitable for power generation in the first and second heat exchanger, and thus air blown from the burner air blower may be supplied to the burner rather than the vertex tube, the optimum temperatures of the cooling water and the reformed gas may be maintained, and high power generation efficiency of the stack may be maintained.

The fuel cell apparatus may include a reformed gas heat exchanger configured to exchange heat between the cooling water having exchanged heat while passing through the first heat exchanger and the reformed gas having exchanged heat while passing through the second heat exchanger and then to supply the cooling water and the reformed gas to the stack, a first bypass flow path configured to allow the air supplied from the vertex tube to the first heat exchanger to bypass the first heat exchanger, a first bypass valve disposed on the first bypass flow path and configured to be opened and closed, a second bypass flow path configured to allow the air supplied from the vertex tube to the second heat exchanger to bypass the second heat exchanger, and a second bypass valve disposed on the second bypass flow path and configured to be opened and closed.

As the cooled air bypasses the second heat exchanger so that the reformed gas does not lose heat to the cooled air in the second heat exchanger while passing through the second heat exchanger, the reformed gas may be supplied to the reformed gas heat exchanger without heat loss so as to exchange heat with the cooling water, and may thus effectively preheat the cooling water passing through the reformed gas heat exchanger.

The first bypass valve may be opened so as not to supply the heated air to the first heat exchanger or the four-way valve may be switched so as not to supply the cooled air to the first heat exchanger, and may prevent the cooling water passing through the first heat exchanger from being preheated or allow the cooling water to be cooled, and therefore, the cooling water may maintain a proper temperature without overheating.

The present disclosure is not limited to the above-described effects, and it is to be understood that other effects which are not described herein will be apparent to those skilled in the art upon reading the specification and the appended claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments may be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fuel cell apparatus comprising:
    a stack configured to provide electrical energy based on electrochemical reaction that includes hydrogen and oxygen;
    a reformer configured to provide reformed gas to the stack;
    a burner configured to heat the reformer;
    a water supply tank configured to provide cooling water to the stack;
    a burner air blower configured to provide external air;
    a main air supply channel configured to provide the external air from the burner air blower to the burner;
    a vertex tube configured to convert the external air from the burner air blower into heated air and cooled air;
    a three-way valve configured to selectively provide the external air from the burner air blower to the main air supply channel and to the vertex tube;
    a four-way valve configured to selectively discharge the heated air and the cooled air from the vertex tube to different ones of a first switch channel and a second switch channel;
    a first heat exchanger configured to exchange heat between the cooling water from the water supply tank and air from the first switch channel;
    a cooling water channel configured to provide the cooling water that has passed through the first heat exchanger to the stack;
    a first air supply channel configured to provide the heated air from the first heat exchanger to the burner;
    a second heat exchanger configured to exchange heat between the reformed gas from the reformer and the cooled air from the second switch channel;
    a reformed gas channel configured to provide the reformed gas from the second heat exchanger to the stack; and
    a second air supply channel configured to provide the air from the second heat exchanger to the burner.

2. The fuel cell apparatus according to claim 1, comprising:
    a hot air supply channel configured to receive the heated air from the vertex tube and to provide the heated air to the four-way valve; and
    a cold air supply channel configured to receive the cooled air from the vertex tube and to provide the cooled air to the four-way valve.

3. The fuel cell apparatus according to claim 1, wherein:
    the first switch channel is to connect the four-way valve to the first heat exchanger; and
    the second switch channel is to connect the four-way valve to the second heat exchanger.

4. The fuel cell apparatus according to claim 3, comprising:
    a first bypass channel to branch from the first switch channel and to join the first air supply channel;
    a first bypass valve disposed at the first bypass channel, and configured to be opened so that air passing through the first switch channel is to bypass the first heat exchanger;
    a second bypass channel to branch from the second switch channel and to join the second air supply channel; and
    a second bypass valve disposed at the second bypass channel, and configured to be opened so that air passing through the second switch channel is to bypass the second heat exchanger.

5. The fuel cell apparatus according to claim 4, comprising:
    a cooling water recovery channel configured to receive the cooling water from the stack and to provide the cooling water to the water supply tank;
    a first temperature sensor configured to sense a temperature value of the cooling water from the stack; and
    a second temperature sensor configured to sense a temperature value of the reformed gas to be provided to the stack.

6. The fuel cell apparatus according to claim 5, comprising a controller configured to control the three-way valve to provide the external air from the burner air blower to the vertex tube, to control the four-way valve to discharge the heated air from the vertex tube to the first switch channel and to discharge the cooled air from the vertex tube to the second switch channel, and to control the first bypass valve to be closed and the second bypass valve to be opened, when the temperature value of the cooling water sensed by the first temperature sensor is determined to be less than a predetermined cooling water temperature value.

7. The fuel cell apparatus according to claim 5, comprising a controller configured to control the three-way valve to provide the external air from the burner air blower to the vertex tube, to control the four-way valve to discharge the heated air from the vertex tube to the second switch channel and to discharge the cooled air from the vertex tube to the first switch channel, and to control the first bypass valve to be closed and the second bypass valve to be opened, when a difference between the temperature value of the cooling water sensed by the first temperature sensor and a predetermined cooling water temperature value is determined to be equal to or greater than a predetermined difference value.

8. The fuel cell apparatus according to claim 5, comprising a controller configured to control the three-way valve to provide the external air from the burner air blower to the vertex tube, to control the four-way valve to discharge the heated air from the vertex tube to the first switch channel and to discharge the cooled air from the vertex tube to the second switch channel, and to control the first bypass valve to be opened and the second bypass valve to be closed, when the temperature value of the cooling water sensed by the first temperature sensor is determined to be equal to or greater than a predetermined cooling water temperature value and a difference between the temperature value of the cooling water sensed by the first temperature sensor and the predetermined cooling water temperature value is determined to be less than a predetermined difference value.

9. The fuel cell apparatus according to claim 8, wherein the controller is configured to control the three-way valve to provide the external air from the burner air blower to the burner, and to control the first bypass valve and the second bypass valve to be closed, when the temperature value of the reformed gas sensed by the second temperature sensor is determined to be equal to or less than a predetermined reformed gas temperature value.

10. The fuel cell apparatus according to claim 1, wherein:
a first end of the first air supply channel is to communicate with the first heat exchanger and a second end of the first air supply channel is to join the main air supply channel; and
a first end of the second air supply channel is to communicate with the second heat exchanger and a second end of the second air supply channel is to join the main air supply channel.

11. The fuel cell apparatus according to claim 1, comprising a cooling water pump configured to provide the cooling water from the water supply tank to the stack.

12. The fuel cell apparatus according to claim 1, comprising a reformed gas heat exchanger configured to exchange heat between the cooling water that has passed through the cooling water channel and the reformed gas that has passed through the reformed gas channel.

13. The fuel cell apparatus according to claim 1, comprising:
a reformed gas bypass channel to branch from the reformed gas channel, and is configured to communicate with the burner;
a reformed gas bypass valve disposed at the reformed gas bypass channel; and
a reformed gas valve disposed downstream from a point of the reformed gas channel in which the reformed gas bypass channel branches from the reformed gas channel.

14. The fuel cell apparatus according to claim 1, comprising:
a stack air blower configured to provide external air to the stack;
a stack air supply channel to connect the stack air blower to the stack;
a stack air exhaust channel to connect the stack to outside of the fuel cell apparatus;
a stack-in valve disposed at the stack air supply channel, and configured to be opened and to be closed; and
a stack-out valve disposed at the stack air exhaust channel, and configured to be opened and to be closed.

15. The fuel cell apparatus according to claim 1, comprising a controller configured to control the three-way valve to provide the external air from the burner air blower to the main air supply channel, when the fuel cell apparatus is to start operation.

16. The fuel cell apparatus according to claim 1, comprising a controller configured to control the three-way valve to provide the external air from the burner air blower to the vertex tube and to control the four-way valve to discharge the heated air from the vertex tube to the first switch channel and to discharge the cooled air from the vertex tube to the second switch channel, when an inner temperature value of the reformer is determined to reach a predetermined reformer temperature value.

17. A method for controlling a fuel cell apparatus that includes a stack configured to produce an electrochemical reaction between hydrogen and oxygen, and a reformer configured to provide reformed gas to the stack, the method comprising:
performing a preheating operation mode configured to provide external air from a burner air blower, provide the external air from the burner air blower to a burner, provide fuel to the burner, and operate the burner so as to preheat the reformer;
performing a reforming operation mode configured to provide the external air from the burner air blower to a vertex tube, provide cooling water from a water supply tank that exchanges heat with heated air from the vertex tube and is then provided to the stack, the reformed gas from the reformer exchanges heat with cooled air from the vertex tube and is then provided to the burner, and the heated air having exchanged heat and the cooled air having exchanged heat are provided to the burner, when an inner temperature value of the reformer is determined to reach a predetermined reformer temperature value; and
performing a power generation operation mode configured such that the reformed gas having exchanged heat with the cooled air exchanges heat with the cooling water having exchanged heat with the heated air and is then provided to the stack, and a stack air blower is operated to provide external air to the stack, when a concentration of carbon monoxide in the reformed gas from the reformer is determined to be equal to or less than a predetermined concentration value.

18. The method according to claim 17, wherein when a temperature value of the cooling water from the stack is determined to be less than a predetermined cooling water temperature value during the performing of the power generation operation mode, the cooled air from the vertex tube is provided to the burner without exchanging heat with the reformed gas from the reformer.

19. The method according to claim 17, wherein when a difference between a temperature value of the cooling water from the stack and a predetermined cooling water temperature value is determined to be equal to or greater than a predetermined difference value during the performing of the power generation operation mode, the cooled air from the vertex tube exchanges heat with the cooling water from the water supply tank and is then provided to the burner, and the heated air from the vertex tube is provided to the burner without exchanging heat with the reformed gas from the reformer.

20. The method according to claim 17, wherein when a temperature value of the cooling water from the stack is determined to be equal to or greater than a predetermined cooling water temperature value and a difference between the temperature value of the cooling water and the predetermined cooling water temperature value is determined to be less than a predetermined difference value during the performing of the power generation operation mode, the heated air from the vertex tube is provided to the burner without exchanging heat with the cooling water from the water supply tank, and the cooled air from the vertex tube exchanges heat with the reformed gas from the reformer and is then provided to the burner.

21. The method according to claim 20, wherein when a temperature value of the reformed gas to be provided to the stack is determined to be equal to or less than a predetermined reformed gas temperature value, the air discharged from the burner air blower is provided to the burner.

* * * * *